(12) United States Patent
Fujita et al.

(10) Patent No.: US 7,590,767 B2
(45) Date of Patent: *Sep. 15, 2009

(54) ELECTRONIC APPARATUS, INFORMATION PROCESSING SYSTEM AND METHOD OF CONTROLLING SAID APPARATUS

(75) Inventors: Kenichi Fujita, Shinagawa (JP); Naoyuki Nagao, Shinagawa (JP); Shinichi Katayama, Shinagawa (JP); Hideki Onishi, Shinagawa (JP); Akihiro Matsunaga, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 762 days.

This patent is subject to a terminal disclaimer.

(21) Appl. No.: 11/189,811

(22) Filed: Jul. 27, 2005

(65) Prior Publication Data

US 2006/0023242 A1 Feb. 2, 2006

(30) Foreign Application Priority Data

Jul. 27, 2004 (JP) ............................. 2004-218802
Mar. 29, 2005 (JP) ............................. 2005-096372

(51) Int. Cl.
*G06F 3/00* (2006.01)
*G06F 9/00* (2006.01)

(52) U.S. Cl. ................................. 710/8; 713/1; 709/321

(58) Field of Classification Search ............... 710/8–14; 713/1–2; 719/321
See application file for complete search history.

(56) References Cited

U.S. PATENT DOCUMENTS

| 5,978,860 | A  | * | 11/1999 | Chan et al. ..................... 710/8 |
| 6,901,545 | B2 | * | 5/2005 | Wheeler ...................... 714/736 |
| 7,031,881 | B2 | * | 4/2006 | Dubal et al. ................. 702/183 |
| 7,200,744 | B2 | * | 4/2007 | Yoon et al. ..................... 713/1 |
| 7,363,632 | B2 | * | 4/2008 | Wong et al. .................. 719/327 |
| 2004/0205778 | A1 | * | 10/2004 | Wong et al. .................. 719/321 |
| 2006/0230191 | A1 | * | 10/2006 | Chang et al. ................... 710/15 |

FOREIGN PATENT DOCUMENTS

| JP | 2003-150530 | 5/2003 |
| JP | 2003-163611 | 8/2003 |
| JP | 2003-256349 | 9/2003 |

* cited by examiner

*Primary Examiner*—Christopher B Shin
(74) *Attorney, Agent, or Firm*—Staas & Halsey LLP

(57) ABSTRACT

An electronic apparatus includes a first device and a second device that stores a driver for the first device. The first device and the second device are capable of generating transactions on a common interface for external connections. The electronic apparatus includes: a setting unit that puts the first device into an enabled state or a disabled state; and a control unit that activates the second device to operate when the first device is put into the disabled state by the setting unit, so that the driver can be read out from the second device via the interface.

28 Claims, 26 Drawing Sheets

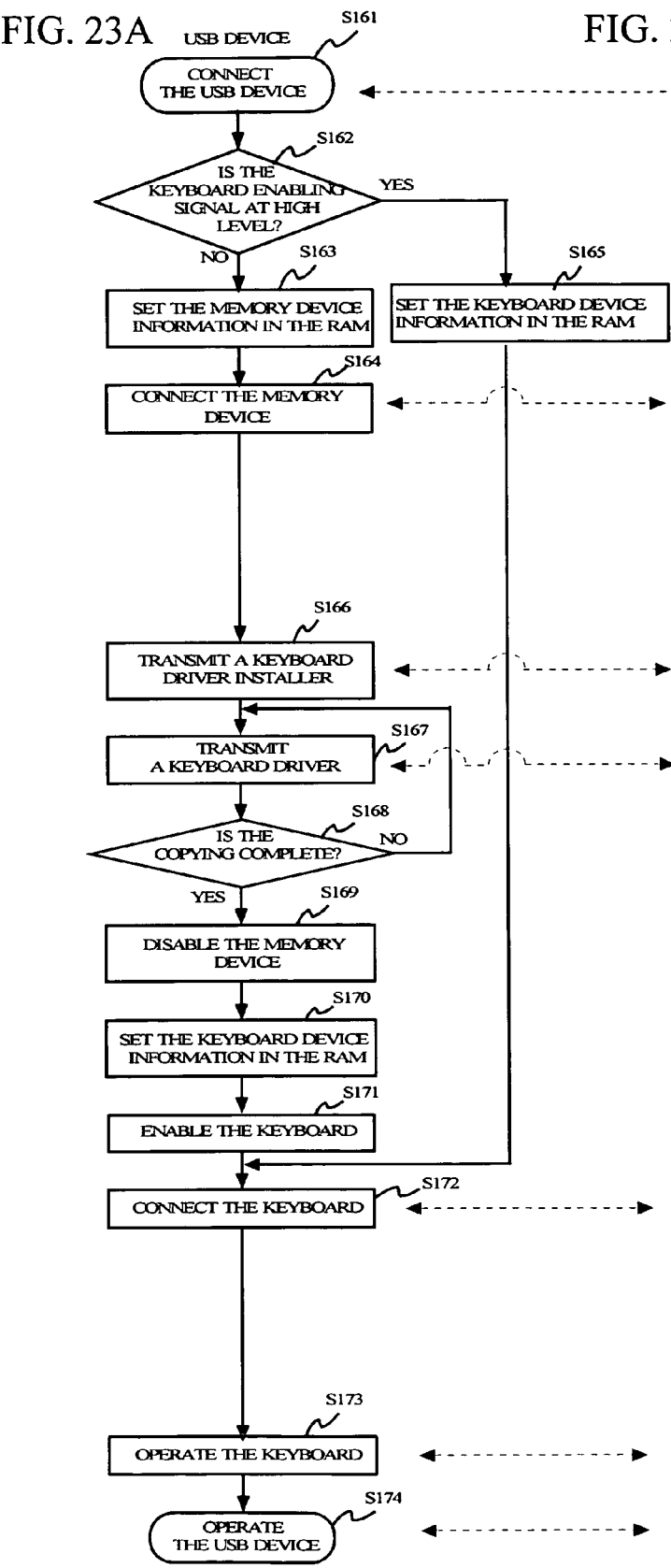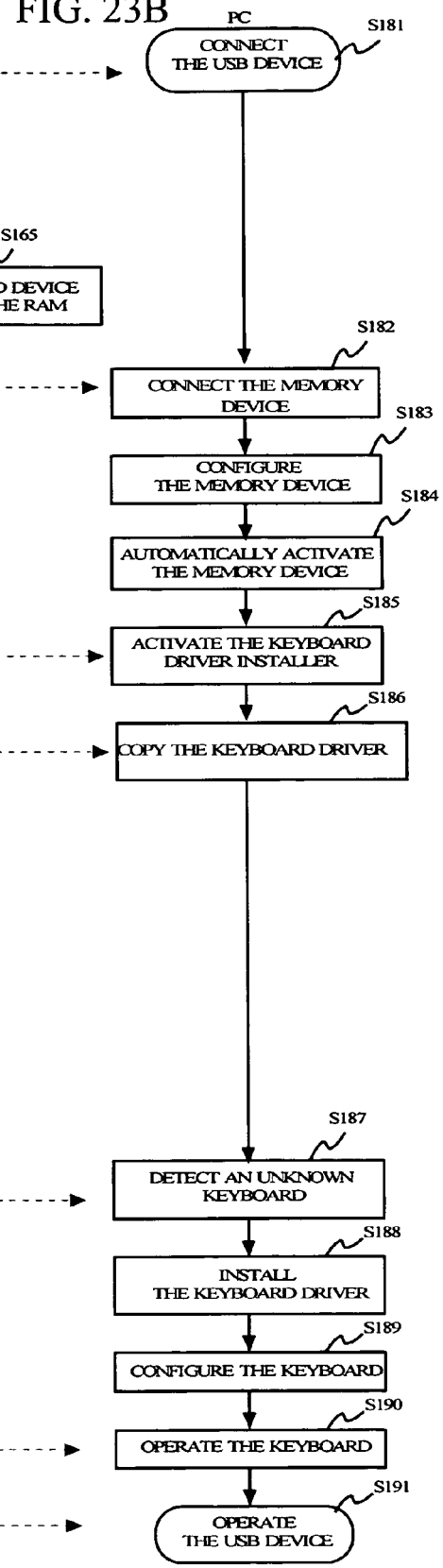
FIG. 23A
FIG. 23B

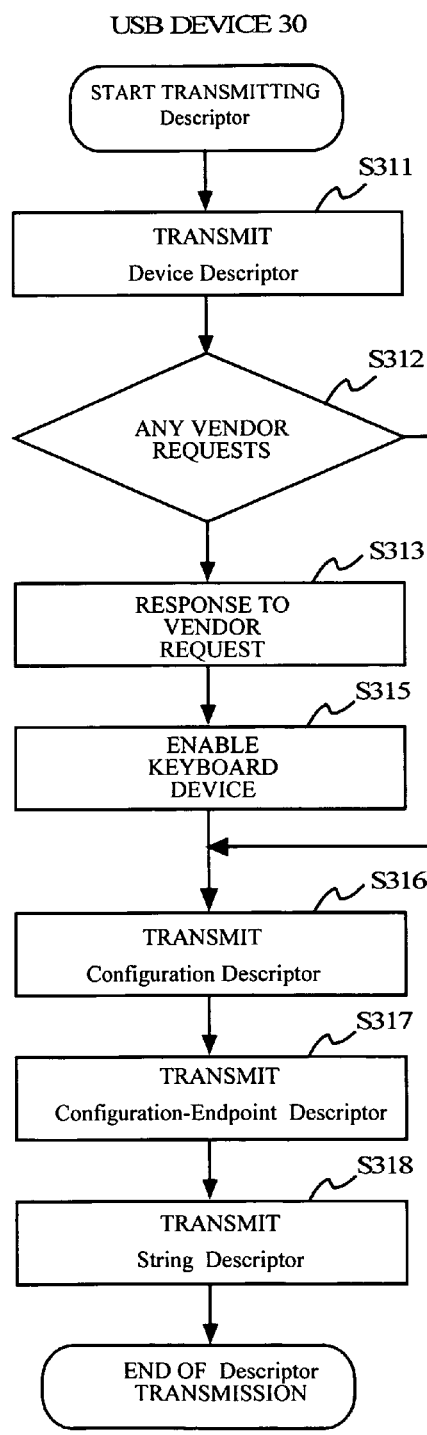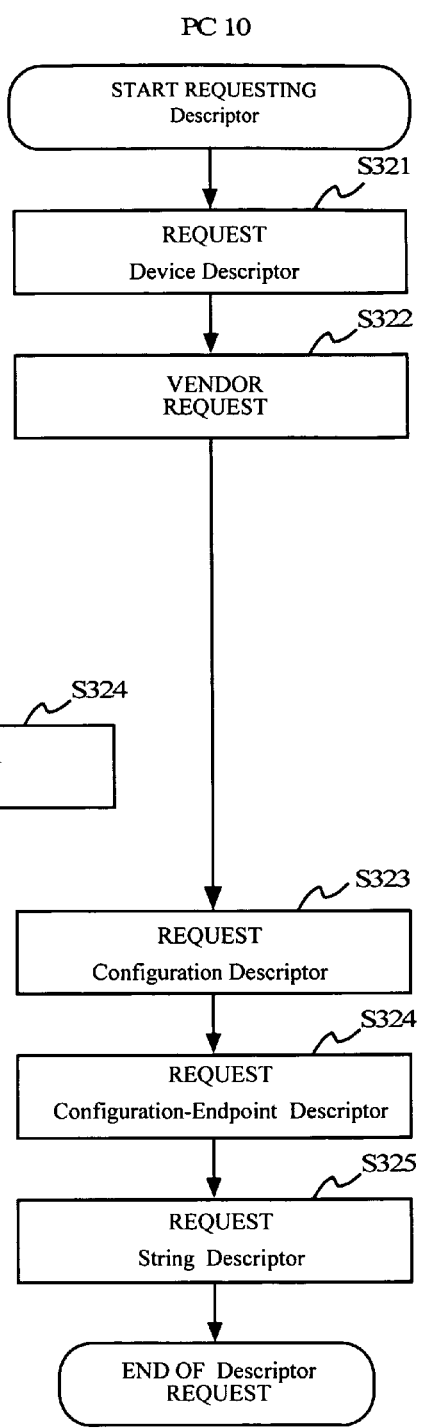
FIG. 29A
FIG. 29B

ELECTRONIC APPARATUS, INFORMATION PROCESSING SYSTEM AND METHOD OF CONTROLLING SAID APPARATUS

BACKGROUND OF THE INVENTION

1. Field of the Invention

The present invention generally relates to an electronic apparatus that has a built-in driver, an information processing system that is equipped with the electronic apparatus, and a method of controlling the electronic apparatus, and more particularly, to a technique of automatically installing the driver for the electronic apparatus in an information processing device when the electronic apparatus is to be connected as a peripheral device to the information processing device.

2. Description of the Related Art

So-called "plug-and-play" (PnP) has become popular, because, with the "plug-and-play" mechanism, a peripheral device can be immediately used without a special process when the peripheral device is connected to an information processing device such as a personal computer.

The applicant has disclosed in Japanese Unexamined Patent Publication No. 2003-256349 (Patent Document 1) that a driver for an electronic device stored in an electronic apparatus is automatically installed in an information processing device. The electronic apparatus disclosed in Patent Document 1 includes a first device and a second device that stores the driver for the first device. The electronic apparatus activates the second device before the first device, so that the driver can be read out from the second device via an interface.

Japanese Unexamined Patent Publication No. 2003-150530 (Patent Document 2) discloses a structure that includes a main device, a sub device that stores a driver program for operating the main device with a host device, and an interface control unit that outputs first data for causing the host device to recognize the sub device when connected to the host device, and then outputs second data for causing the host device to recognize the main device.

With the technique disclosed in Patent Document 1, however, once the electronic apparatus is connected to an information processing device and installs the driver software in the device, the second device cannot be in an enabled state when the electronic apparatus is connected to another information processing device. As a result, the driver software cannot be installed in the information processing device.

With the technique disclosed in Patent Document 2, the interface control unit that causes the host device to recognize the sub device and then the main device is essential when connected to the host device. Because of the interface control unit, the device structure becomes complicated.

SUMMARY OF THE INVENTION

It is therefore an object of the present invention to provide an electronic apparatus, an information processing system, and a method of controlling the apparatus in which the above disadvantage is eliminated.

A more specific object of the present invention is to provide an electronic apparatus and an information processing system that can automatically install driver software with a simple structure, regardless of the state of the device. The present invention is also to provide a method of controlling the electronic apparatus and the information processing system.

According to one aspect of the present invention, preferably, there is provided an electronic apparatus that includes a first device and a second device that stores a driver for the first device, the first device and the second device being capable of generating transactions on a common interface for external connections. The electronic apparatus may include a setting unit that puts the first device into an enabled state or a disabled state; and a control unit that activates the second device to operate when the first device is put into the disabled state by the setting unit, so that the driver can be read out from the second device via the interface.

According to another aspect of the present invention, preferably, there is provided an information processing system including an electronic apparatus that includes a first device and a second device that stores a driver for the first device, the first device and the second device being capable of generating transactions on a common interface for external connections; and an information processing device that is connected to the electronic apparatus via the common interface. The electronic apparatus may include a setting unit that puts the first device into an enabled state or a disabled state; and a control unit that activates the second device to operate when the first device is put into the disabled state by the setting unit, so that the driver can be read out from the second device via the interface.

According to still another aspect of the present invention, preferably, there is provided a method of controlling an electronic apparatus that includes a first device and a second device that stores a driver for the first device, the first device and the second device being capable of generating transactions on a common interface for external connections. The method may include the steps of: putting the first device into an enabled state or a disabled state; and activating the second device to operate when the first device is put into the disabled state, so that the driver can be read out from the second device via the interface.

According to yet another aspect of the present invention, preferably, there is provided a method of controlling an information processing system that includes an electronic apparatus containing a first device and a second device that stores a driver for the first device, and an information processing device that is connected to the electronic apparatus via a common interface for external connections. The method may include the steps of: changing the number of requests for part of device information between the first device and the second device, when the information processing device requests the electronic apparatus to transmit the device information of a device to be configured; and counting the number of requests for part of the device information of the device to be configured, the requests being transmitted from the information processing device, so that the electronic apparatus can determine whether the configuring is for the first device or the second device.

According to further another aspect of the present invention, preferably, there is provided a method of controlling an information processing system that includes an electronic apparatus containing a first device and a second device that stores a driver for the first device, and an information processing device that is connected to the electronic apparatus via a common interface for external connections. The method may include the steps of: detecting a signal transmitted from the information processing system in process of configuration; enabling the second device when the signal cannot be detected; and enabling the first device when the signal is detected.

BRIEF DESCRIPTION OF THE DRAWINGS

Other objects, features and advantages of the present invention will become more apparent from the following detailed description when read in conjunction with the accompanying drawings, in which:

FIGS. 23A and 23B are flowcharts of the operation in accordance with the fourth embodiment;

FIGS. 29A and 29B are flowcharts of changing an enabled device according to a vendor request during the configuration procedures and executing the configuration procedures;

DESCRIPTION OF THE PREFERRED EMBODIMENTS

The following is a description of preferred embodiments of the present invention, with reference to the accompanying drawings.

First Embodiment

Figure 1:
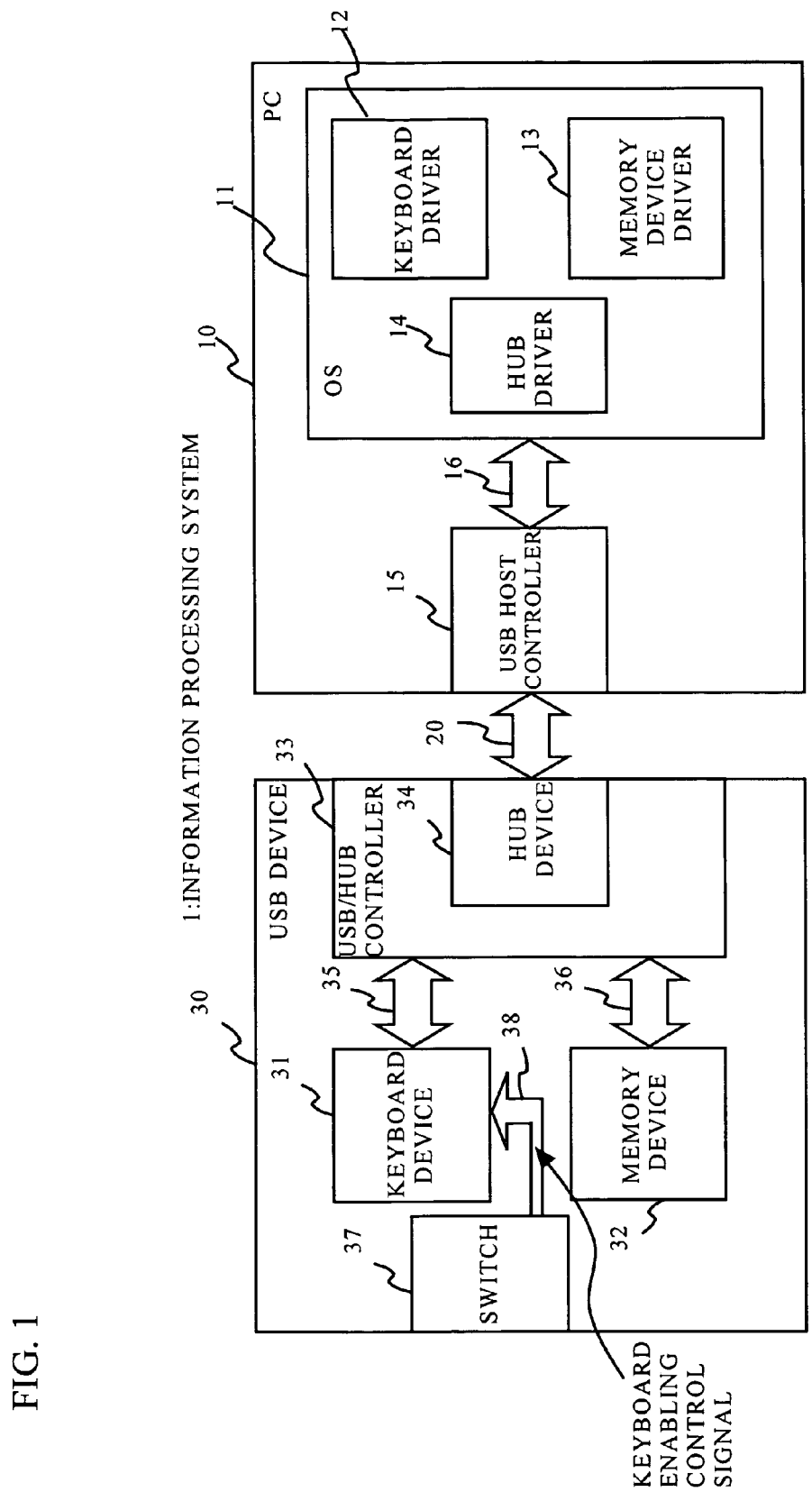
FIG. 1 is a block diagram illustrating a first embodiment of the present invention.

FIG. 1 is a block diagram illustrating the structure of an information processing system 1 in accordance with a first embodiment of the present invention. The information processing system 1 includes an information processing device 10 and an electronic device 30. The information processing device 10 may be a personal computer, for example. The electronic device 30 is a peripheral device that can be connected to the information processing device 10, and is a keyboard in the example structure shown in FIG. 1. The information processing device 10 and the electronic device 30 are connected to each other with a USB cable 20. Hereinafter, the electronic device 30 is referred to as the USB device 30, and the information processing device 10 is referred to as the PC 10.

The OS 11 of the PC 10 may be Windows (registered tradename) of Microsoft Corporation, for example. In FIG. 1, a keyboard driver 12, a memory device driver 13, and a HUB driver 14 are installed in the OS 11. Among these drivers, the memory device driver 13 and the HUB driver 14 are standard device drivers that are incorporated into the OS 11. The keyboard driver 12 is installed following the later described procedures. Although not shown, various programs that constitute an OS, other drivers, and various utilities are installed in the OS 11. The OS 11 is connected to a USB host controller 15 via an internal bus 16. The hardware structure of the PC 10 includes a CPU, a RAM, and a ROM, like other general personal computers. The USB host controller 15 supports the USB, and connects the functions of peripheral devices connected to the PC 10, so as to provide the functions of the peripheral devices onto the OS 11.

The USB device 30 includes a keyboard device 31, a memory device 32, a HUB device 34 provided in a USB/HUB controller 33, and a switch 37. The keyboard device 31, the memory device 32, and the HUB device 34 are functions (peripheral devices) for the PC 10. With these devices, transactions can be caused on the USB interface. The keyboard device 31 and the memory device 32 are connected to the USB/HUB controller 33 via HUB ports 35 and 36 that are USB buses. The switch 37 outputs a keyboard enabling control signal 38 to put the keyboard device 31 into an enabled state or a disabled state.

The keyboard device 31 has hardware and software that form a keyboard. The keyboard enabling control signal 38 that is output from the switch 37 puts the keyboard device 31 into an enabled state or a disabled state. In the enabled state, the keyboard device 31 can operate. In the disabled state, at least the connection of the keyboard device 31 is not recognized on the USB interface. An example of the disabled state of the keyboard device 31 is described later. The keyboard enabling control signal 38 is a special signal that is supplied to the general-purpose input/output terminal or the external interrupt terminal of the keyboard device 31. When the keyboard enabling control signal 38 is at the high level, the keyboard device 31 is in the enabled state. When the keyboard enabling control signal 38 is at the low level, the keyboard device 31 is in the disabled state. When the keyboard device 31 is put into the enabled state, the connection state is output to the HUB port 35 in accordance with the USP standard. The structure of the keyboard device 31 is described later in greater detail.

The memory device 32 has hardware and software for providing a memory function. The memory device 32 houses a keyboard driver. In accordance with a predetermined sequence (described later), the keyboard driver is read out from the memory device 32, and is incorporated as the keyboard driver 12 into the OS 11. The device driver of the memory device 32 is incorporated as the memory device driver 13 into the OS 11. An example structure of the memory device 32 is described later.

The USB/HUB controller 33 has hardware and software that support the USB and HUB. The USB/HUB controller 33 includes the HUB device 34. The HUB device 34 is an internal program that operates with a program for controlling the HUB, and is a function as the USB in this embodiment. The HUB device 34 monitors the condition of the USB cable 20, and outputs the keyboard enabling control signal 38 to the keyboard device 31. The HUB is a line concentrator in accordance with the USB standard. In the structure shown in FIG. 1, the HUB controls the transactions between the keyboard device 31, the memory device 32, and the USB cable (or a USB bus or a USB interface). The USB/HUB controller 33 connects the keyboard device 31 and the memory device 32, which are USB devices, in accordance with the USB standard. An example structure of the USB/HUB controller 33 is described later.

Figure 2A:
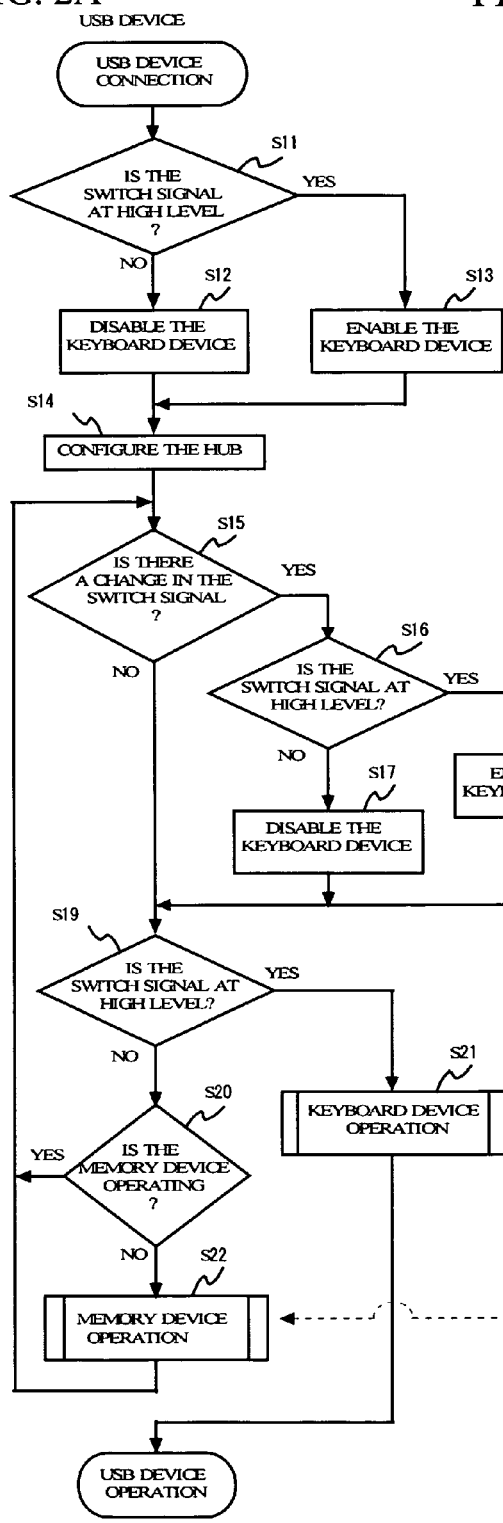
FIGS. 2A and 2B are flowcharts of the operation in accordance with the first embodiment.
Figure 2B:
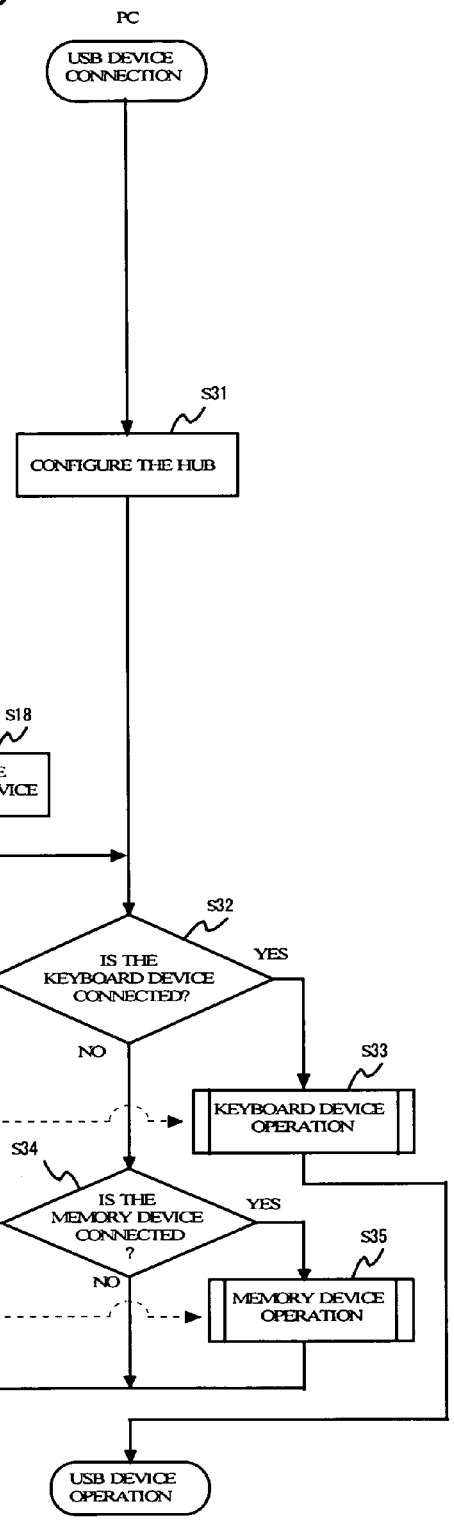

Referring now to FIGS. 2A and 2B, the operation of the first embodiment is described. FIG. 2A shows an operation sequence of the USB device 30, and FIG. 2B shows an operation sequence of the PC 10.

First, the switch 37 of the USB device 30 is set to the "keyboard device disabled state", and connects the USB device 30 to the PC 10. As the USB device 30 is connected to the PC 10, the keyboard device 31 checks the signal state of the keyboard enabling control signal 38 from the switch 37 (step S11). If the signal is at the low level, ("NO" in step S11), the keyboard device 31 is put into the disabled state (step S12). If the signal is at the high level, ("YES" in step S11), the keyboard device 31 is put into the enabled state (step S13). Here, the switch 37 is set to the disabled state.

On the side of the PC 10, the HUB driver 14 incorporated into the OS 11 starts operating, and sets the HUB configuration (step S31). Meanwhile, the HUB configuration is also set in the USB device 3b (step S14). After that, the HUB device 34 of the USB/HUB controller 33 starts functioning.

Here, the keyboard device 31 again checks the keyboard enabling control signal 38 from the switch 37. If there is not a change in the keyboard enabling control signal 38 ("NO" in step S15), the keyboard device 31 again checks the keyboard enabling control signal 38 (step S19). If there is a change in the keyboard enabling control signal 38 ("YES" in step S15), the keyboard device 31 determines whether the keyboard enabling control signal 38 is at the high level (step S16). If the keyboard enabling control signal 38 is at the high level ("YES" in step S16), the keyboard device 31 is put into the enabled state (step S18). If the keyboard enabling control signal 38 is at the low level ("NO" in step S16), the keyboard device 31 is put into the disabled state (step S17).

The signal state of the keyboard enabling control signal 38 from the switch 37 is checked again (step S19). If the signal is at the low level ("NO" in step S19), the operation moves on to checking the operation of the memory device 32 (step S20). If the signal is at the high level ("YES" in step S19), the operation moves on to a keyboard device operation (step S21). Since the setting of the switch is low at this point, the operation moves on to checking the operation of the memory device 32 (step S20).

Figure 3A:
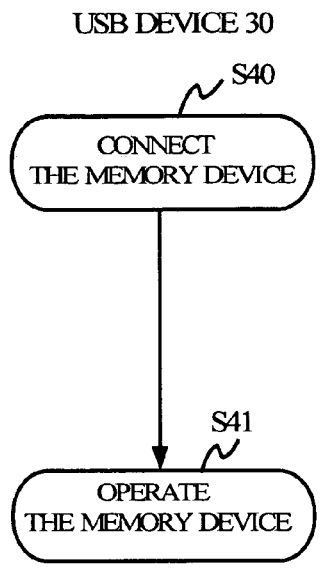
FIGS. 3A and 3B are flowcharts of the procedures for configuring the memory device.
Figure 3B:
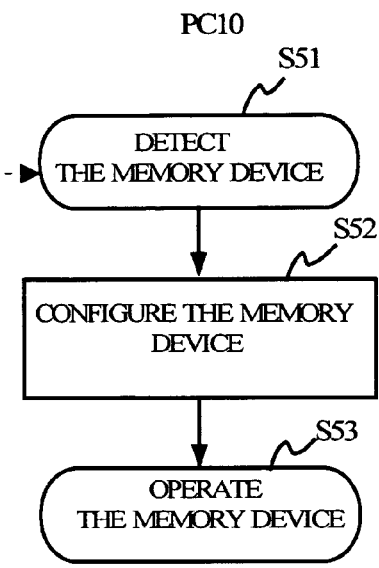

Since the memory device 32 has not been configured yet ("NO" in step S20, "YES" in step S34), the operation moves on to a memory device operation (step S22, step S35). FIGS. 3A and 3B show the memory device operation. FIG. 3A shows the operation sequence of the USB device 30, and FIG. 3B shows the operation sequence of the PC 10. When the memory device 32 starts operating, the PC 10 detects the memory device 32 (step S51). The memory device driver 13 incorporated into the OS 11 then configures the memory device 32 (step S52). As a result, the memory device 32 operates as a disk drive (step S53).

Referring back to the flowcharts of FIGS. 2A and 2B, the switch 37 is monitored, and the procedures of steps S15 through S20 are repeated until a change is detected in the switch setting.

Figure 4A:
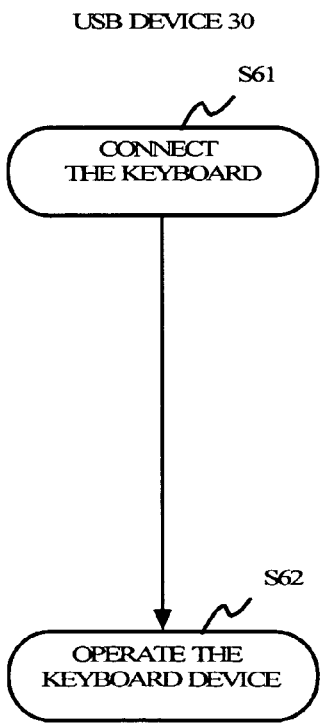
FIGS. 4A and 4B are flowchart of the procedures for configuring the keyboard device.
Figure 4B:
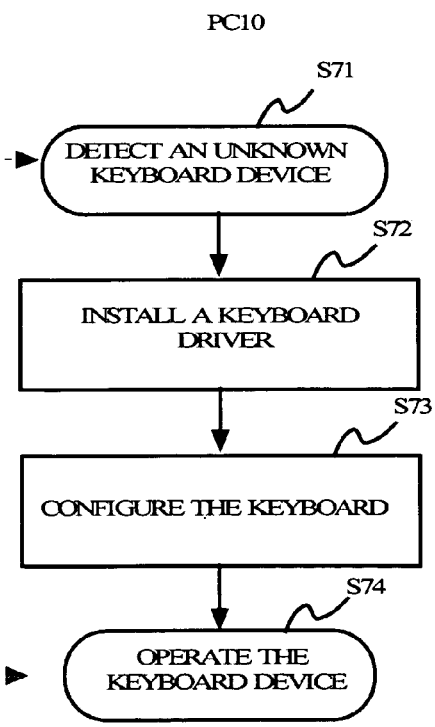

Here, the switch setting is changed to put the keyboard device 31 into the enabled state. The keyboard device 31 then detects the change in the state of the signal from the switch 37 (step S15), and, if the signal is at the high level, the keyboard device 31 is put into the enabled state (step S18). Since the signal is at the high level ("YES" in step S19, "YES" in step S32), the operation moves on to a keyboard device operation (step S21, step S33). FIGS. 4A and 4B illustrate the keyboard device operation in detail. FIG. 4A shows the operation sequence of the USB device 30, and FIG. 4B shows the operation sequence of the PC 10. The keyboard device 31 starts operating upon receipt of the keyboard enabling control signal 38. As a result, the PC 10 detects an "unknown" keyboard device (step S71). The PC 10 then determines whether the corresponding driver is stored in a memory device such as a HDD in the PC 10. In this example, a keyboard driver is not installed in the PC 10. Accordingly, the OS 11 accesses the memory device 32 that is recognized as an external disk drive. The keyboard driver stored in the memory device 32 is then read out (step S72), and the keyboard device 31 is configured (step S73).

In this manner, a keyboard driver can be automatically incorporated into the OS 11. When a user is to install a driver, all he/she has to do is to connect the USB device 30 to the PC 10 to start using the USB device 30, regardless of which memory unit the driver is stored in. Thus, the user can experience "plug-and-play".

Although not shown, the attribute of the keyboard driver stored in the memory device 32 is made "Read Only", so that the keyboard driver can be prevented from being inadvertently erased from the memory device 32. More specifically, when the USB device 30 is connected, the keyboard driver is invariably read in, and the keyboard device 31 is operated. Also, a keyboard driver may be written in a protected area in the memory device 32. By doing so, the keyboard driver cannot be erased from the memory device 32.

Figure 5:
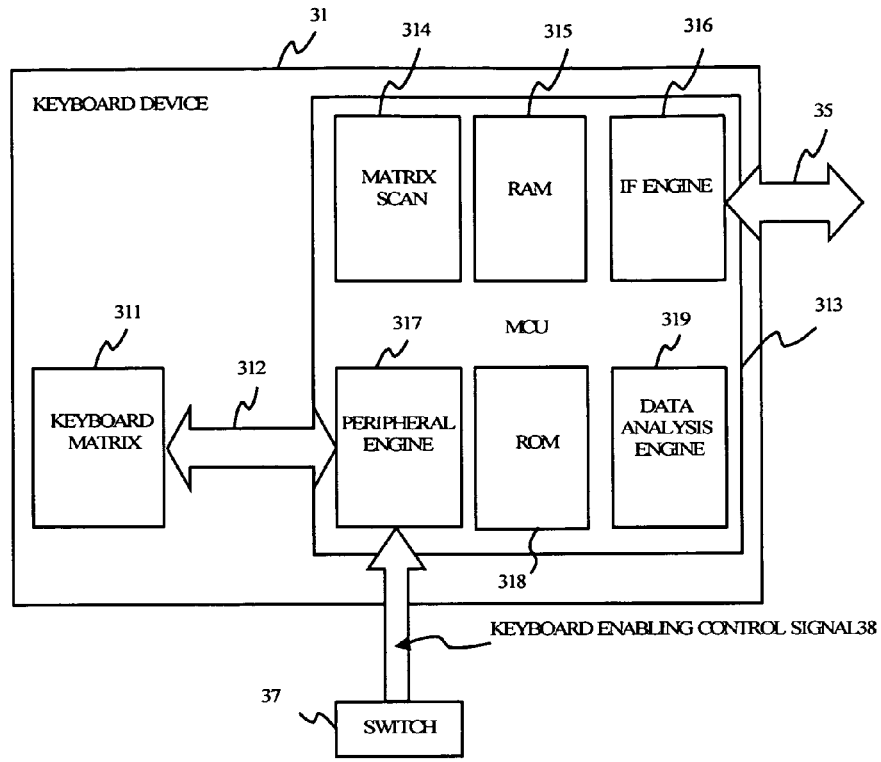
FIG. 5 is a block diagram illustrating an example structure of the keyboard device.

FIG. 5 illustrates the structure of the keyboard device 31 in detail. The keyboard device 31 is a function (a peripheral device) on the USB interface, and includes a MCU (Micro Control Unit) 313, a keyboard matrix 311, and a port 312 to connect the MCU 313 and the keyboard matrix 311. The MCU 313 includes a matrix scan 314, a RAM 315, an interface engine (an IF engine) 316, a peripheral engine 317, a ROM 318, and a data analysis engine 319.

The keyboard matrix 311 is a mechanical structure in which keys are arranged in a matrix fashion. The matrix scan 314 scans the keyboard matrix 311 to determine whether each key is ON or OFF. The matrix scan 314 is an essential logic unit for the keyboard. The keyboard matrix 311 is connected to the peripheral engine 317 via the port 312. The peripheral engine 317 receives the keyboard enabling control signal 38 from the switch 37 via a general input/output port or an interrupt terminal. The keyboard enabling control signal 38 may be any type of signal, as long as the MCU 313 can detect whether it is at the high level or low level. As described above, when the keyboard enabling control signal 38 is at the high level, the keyboard device 31 is in the enabled state in which the keyboard device 31 can be operated. When the keyboard enabling control signal 38 is at the low level, the keyboard device 31 is in the disabled state in which the keyboard device 31 cannot be operated. The data analysis engine 319 obtains key data from the matrix scan 314 and the peripheral engine 317, and determines whether the keyboard device 31 is allowed to operate based on the level of the keyboard enabling control signal 38. Thus, the data analysis engine 319 controls the entire MCU 313.

The interface engine (IF engine) 316 provides an interface for connecting the keyboard device 31 to the outside. The interface engine 316 monitors and controls the connecting state, and controls all transactions through an external bus interface (equivalent to the USB cable 20). The data analysis engine 319 allows the interface engine (IF engine) 316 and the matrix scan 314 to operate, if the keyboard enabling control signal 38 is at the high level. The data analysis engine 319 prohibits the interface engine (IF engine) 316 and the matrix scan 314 from operating, if the keyboard enabling control signal 38 is at the low level. The peripheral engine 317 operates even in the disabled state, so as to detect the state of the keyboard enabling control signal 38. While allowing the interface engine (IF engine) 316 to operate, the data analysis engine 319 receives the key state from the matrix scan 313, and, if necessary, outputs the data to the outside through the interface engine (IF engine) 316. The data analysis engine 319 also receives data from the outside through the interface engine (IF engine) 316, and performs an appropriate operation in accordance with the contents of the data. The matrix scan 314, the data analysis engine 319, and the interface engine (IF engine) 316 operate with the ROM 318 or the RAM 315 in the MCU 313, or with a ROM or a RAM attached to the MCU 313 from the outside. The various data that are required by the matrix scan 314, the peripheral engine 317, and the data analysis engine 319 are stored in the ROM 318 or the RAM 315 in the MCU 313, or a ROM or a RAM attached to the MCU 313 from the outside.

Figure 6:
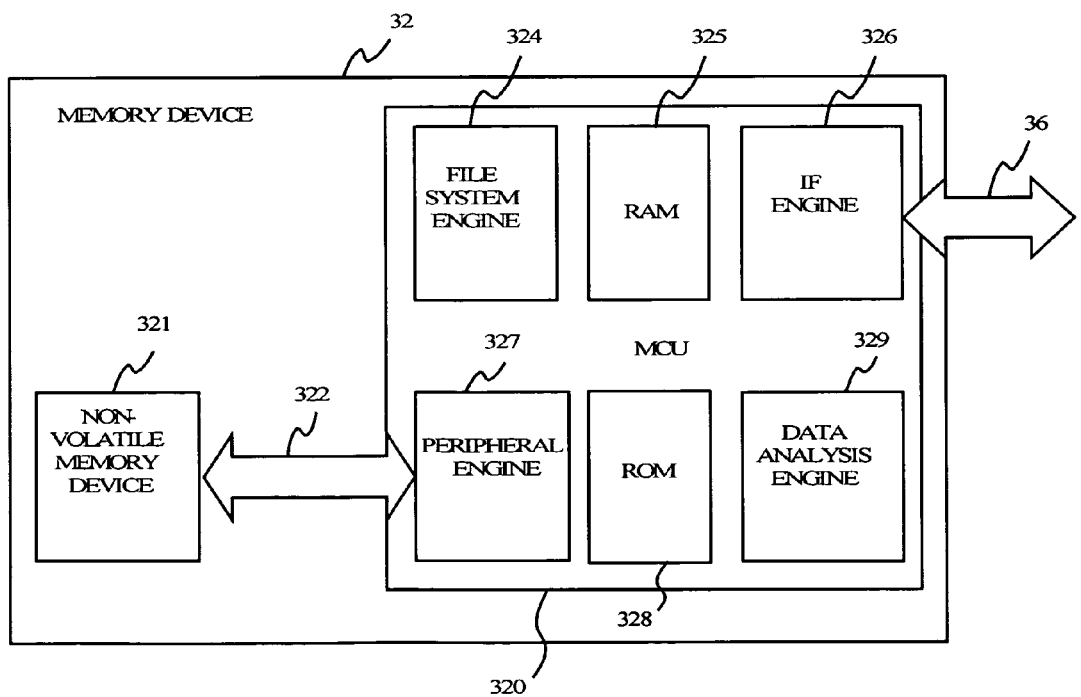
FIG. 6 is a block diagram illustrating an example structure of the memory device.

FIG. 6 is a block diagram illustrating an example structure of the memory device 32. The memory device 32 is a function (a peripheral device) on the USB interface, and includes a MCU (Micro Control Unit) 320, a non-volatile memory device 321, and a port 322 to connect the MCU 320 and the non-volatile memory device 321. The MCU 320 includes a file system engine 324, a RAM 325, an interface engine (IF engine) 326, a peripheral engine 327, a ROM 328, and a data analysis engine 329.

The non-volatile memory device 321 is formed with a non-volatile memory such as a flash ROM or a FeRAM, and is controlled by the MCU 320. The driver of the keyboard device 31 is stored in the non-volatile memory device 321. The non-volatile memory device 321 is connected to the peripheral engine 327 of the MCU 320 via the port 322. When seen from the MCU 320, the non-volatile memory device 321 appears to be an externally connected RAM or ROM or an internal RAM or ROM. The non-volatile memory device 321 operates as a valid disk drive for the external bus interface (equivalent to the USB cable 20), regardless of the existence of the RAM 325 or the ROM 328 in the MCU 320. Therefore, the file system engine 324 that manages the contents in the non-volatile memory device 321 as files is mounted on the MCU 320. The file system engine 324 manages the contents of the memory in the non-volatile memory device 321 as files. There are various methods for file management. In a case where a file on the side of the PC 10 is stored in the memory device 32, it is necessary to manage where the memory contents corresponding to the contents of the file are recorded on the memory device 32, and where the information as to the name of the file and the time stamp and the information indicating that the recorded contents are in the form of a file are recorded on the memory device 32. The information as to the recording means should also be managed. A file read/write request is issued from the HUB port 36 to the interface engine (IF engine) 326 of the MCU 320. The data analysis engine 329 examines the contents of the request, and controls the file system engine 324 and the peripheral engine 327.

Figure 7:
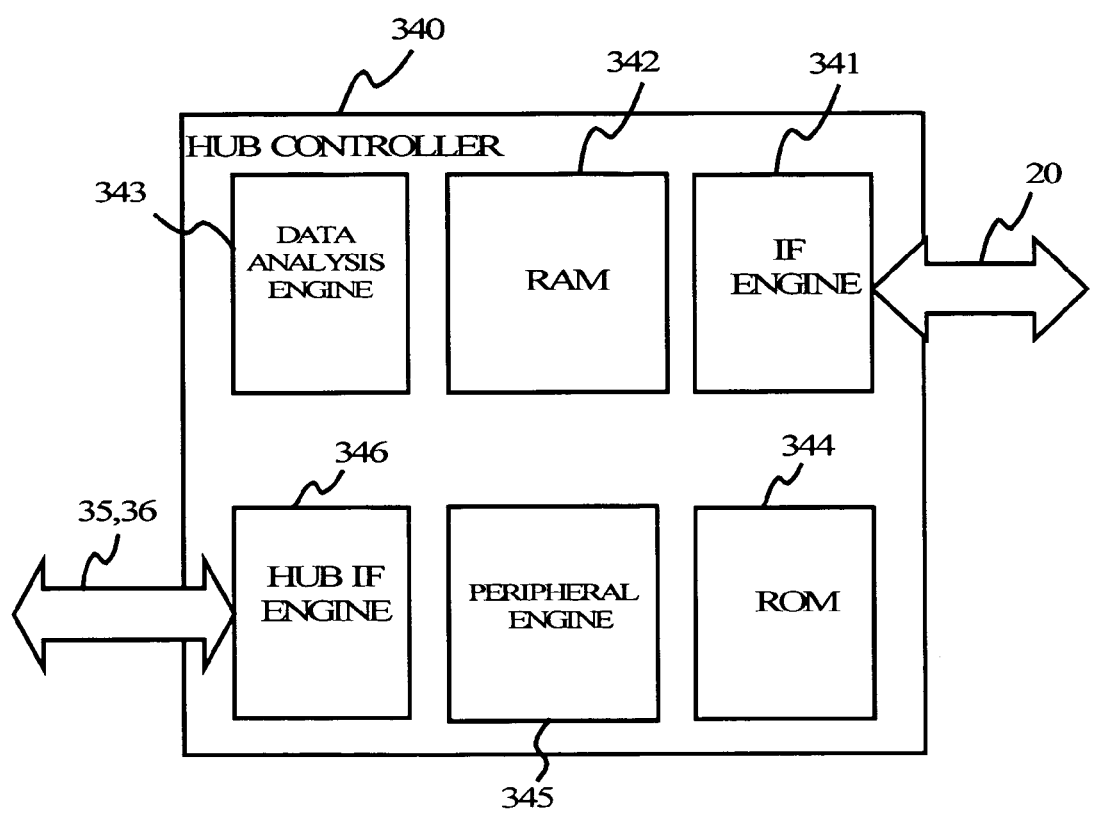
FIG. 7 is a block diagram illustrating an example structure of the HUB controller of the USB/HUB controller.

FIG. 7 is a block diagram illustrating an example structure of a HUB controller 340 of the USB/HUB controller 33. The HUB controller 340 includes an interface engine (IF engine) 341, a RAM 342, a data analysis engine 343, a ROM 344, a peripheral engine 345, and a HUB interface engine (IF engine) 346. The HUB device 34 shown in FIG. 1 is embodied by the peripheral engine 345.

The HUB ports 35 and 36 are connected to the HUB interface engine (IF engine) 346. The HUB interface engine (IF engine) 346 performs a HUB configuration establishing process that is equivalent to steps S14 and S31 in FIGS. 2A and 2B. The USB cable 20 is connected to the interface engine (IF engine) 341. The data analysis engine 343 analyzes data and signals that are received through the HUB ports 35 and 36 and the USB cable 20, and controls the entire HUB controller 340. The RAM 342 functions as the work memory for each engine. The ROM 344 stores programs and data that specify the operation of each engine.

Modification of First Embodiment

Figure 8:
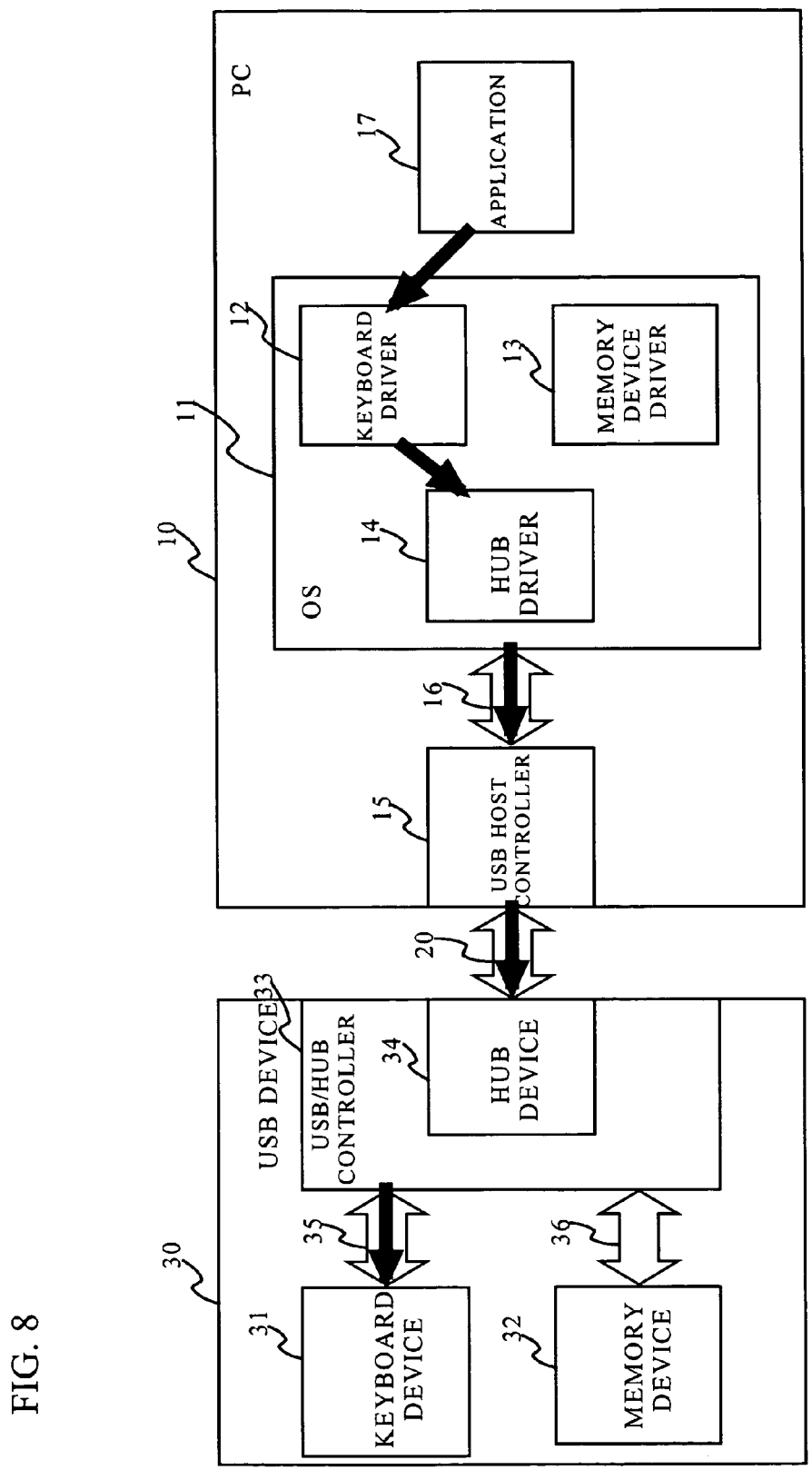
FIG. 8 illustrates the flow of the control signal in a case where the keyboard device is controlled by the application software in the PC.

The following are other examples of the structures for switching the keyboard device 31 between the enabled state and the disabled state. The information processing system 1 shown in FIG. 8 inputs the keyboard enabling control signal 38 to the keyboard device 31 from application software 17 that operates in the PC 10. The keyboard enabling control signal 38 is transmitted as a vender request from the application software 17 to the keyboard driver 12, and from the keyboard driver 12 to the keyboard device 31, as indicated by the arrows in FIG. 8. Receiving the keyboard enabling control signal 38 output from the USB/HUB controller 33, the keyboard device 31 is switched between the enabled state and the disabled state.

Figure 9:
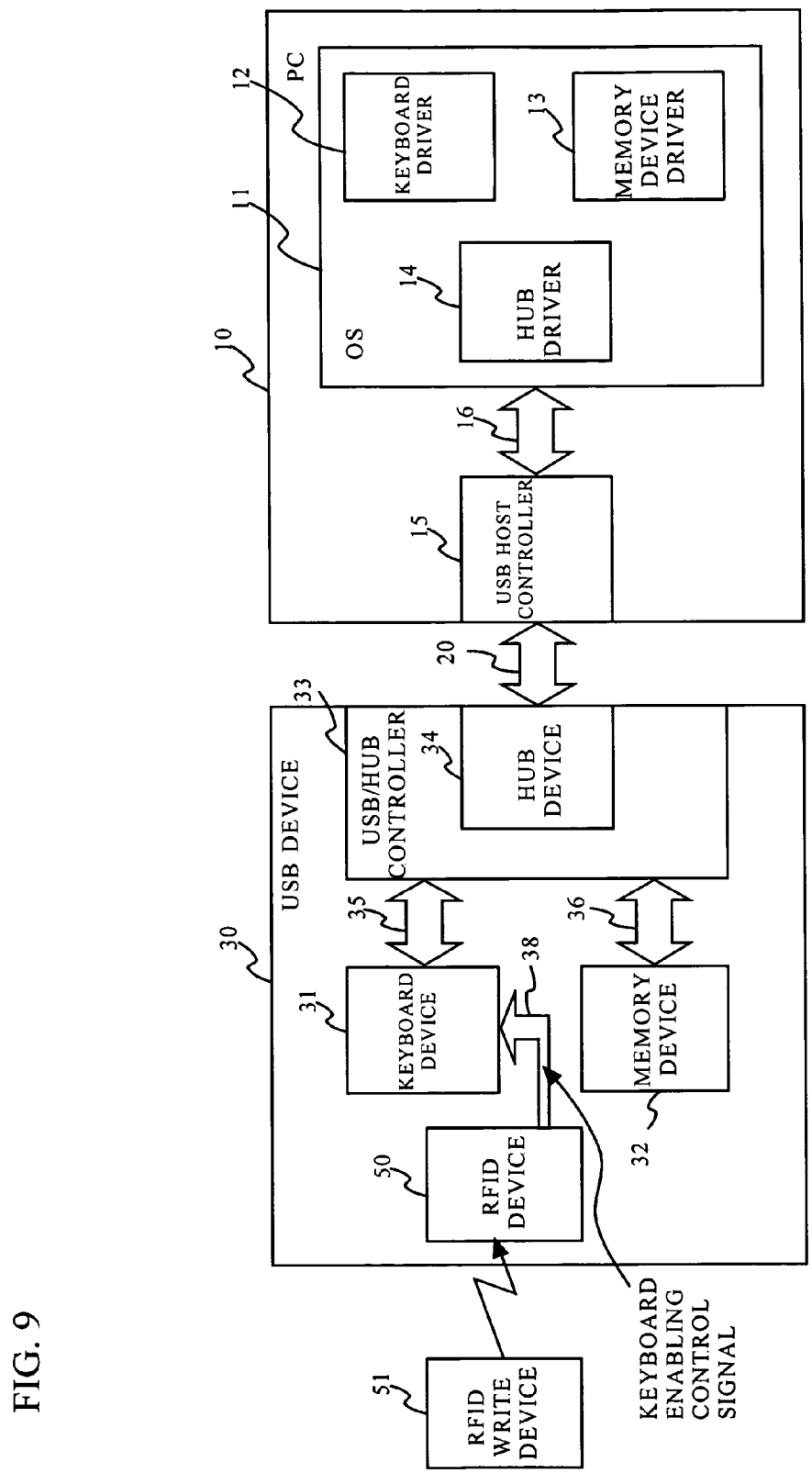
FIG. 9 illustrates a structure in which the keyboard is switched between the enabled state and the disabled state through a RFID.

The information processing system 1 shown in FIG. 9 has a RFID (Radio Frequency Identification) device 50 incorporated into the USB device 30. An external RFID write device 51 sets the RFID device 50 of the USB device 30 to the enabled mode or the disabled mode of the keyboard device 31. In accordance with the setting by the external RFID write device 51, the RFID device 50 outputs the keyboard enabling control signal 38 to the keyboard device 31. The keyboard device 31 is switched between the enabled state and the disabled state by the keyboard enabling control signal 38. Using the RFID, only a designated user can perform writing in the RFID device 50. In this embodiment, the keyboard device 31 is mounted on the USB device 30. However, in a case where the keyboard device 31 is another peripheral device, the RFID device 50 is mounted on the USB device 30 so as to form a structure in which only a designated user is allowed to use the peripheral device.

Figure 10:
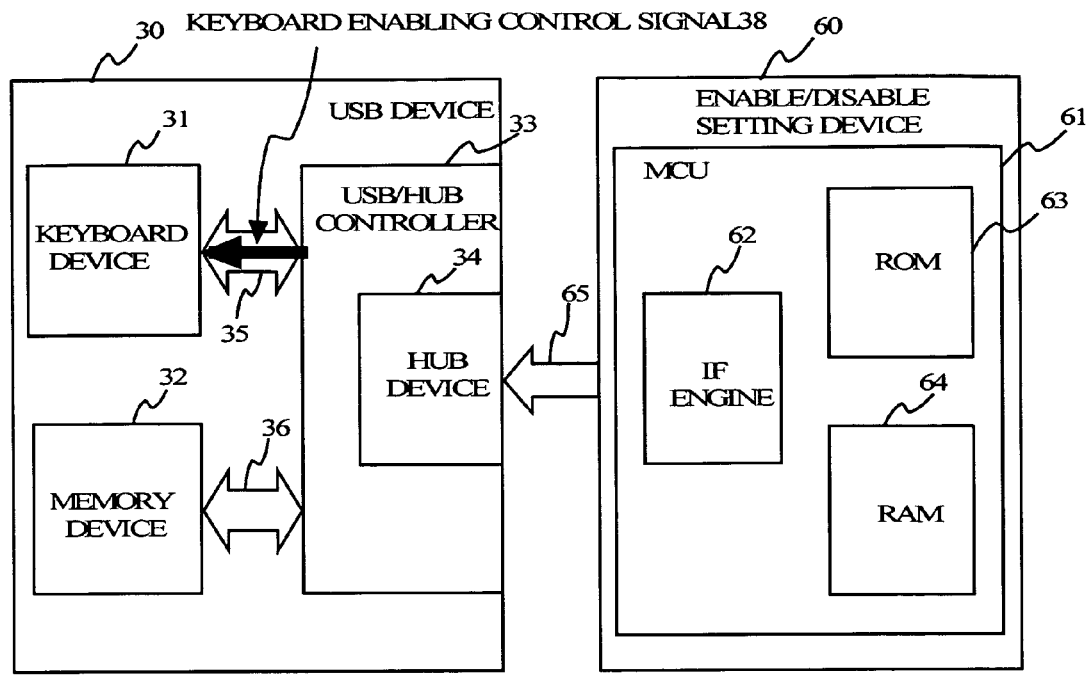
FIG. 10 illustrates a structure in which the keyboard device is switched between the enabled state and the disabled state through an enable/disable setting device.

The information processing system 1 shown in FIG. 10 sets the keyboard device 31 to the enabled state or the disabled state through an enable/disable setting device 60 that is specially provided. As the enable/disable setting device 60 is connected to the USB device 30, a signal for changing the state of the keyboard enabling control signal 38 is transmitted to the USB device 30 through an interface engine (IF engine) 62. The USB device 30 receives the signal through the USB/HUB controller 33, and sets the keyboard enabling control signal 38 in accordance with the received signal.

If the interface engine (IF engine) 62 of the enable/disable setting device 60 is a USB host controller, the signal for changing the state of the keyboard enabling control signal can be transmitted as a vender request command in accordance with the USB standard. If the interface engine (IF engine) 62 is a device in compliance with the signal characteristics that are specified by the USB standard, a reset signal and an IDLE signal are alternately transmitted from the interface engine (IF engine) 62 at regular intervals within a predetermined period of time since the connection. The USB device 30 counts the number of resets carried out by the reset signal within the predetermined period of time. By doing so, the USB device 30 determines whether to set the keyboard enabling control signal 38 to the enabled state or the disabled state. Thus, the enable/disable setting device 60 can be provided at a low cost.

Figure 11:
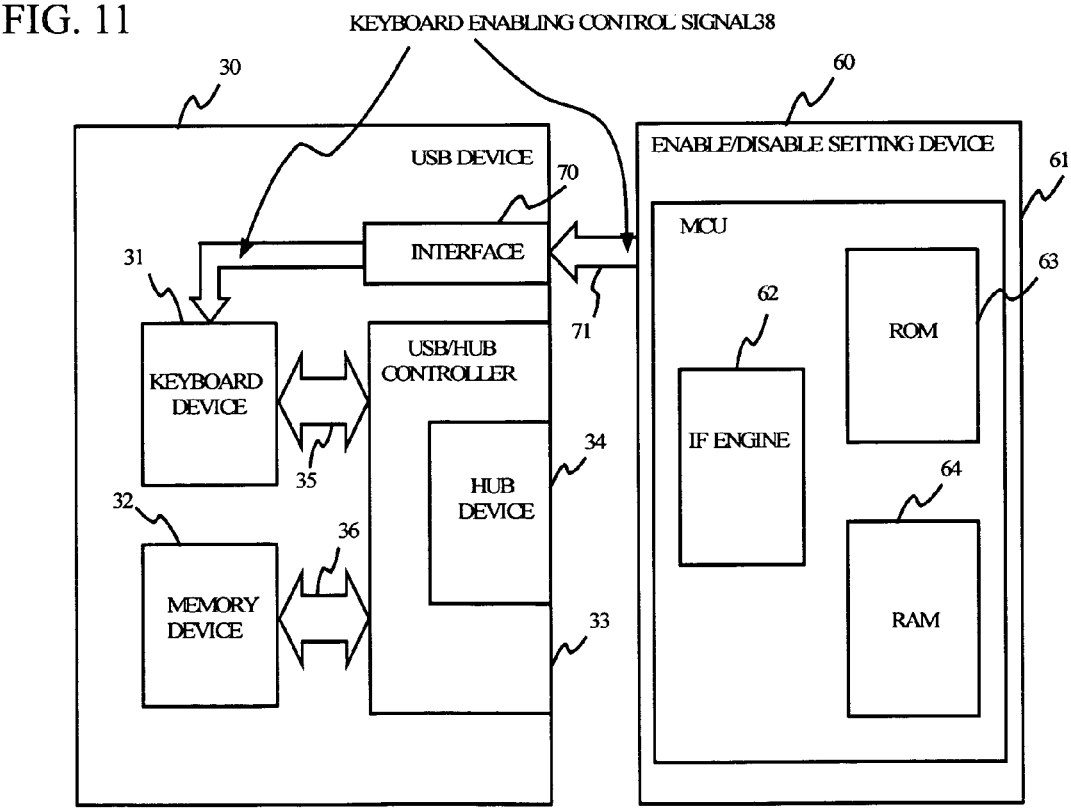
FIG. 11 illustrates another structure in which the keyboard device is switched between the enabled state and the disabled state through an enable/disable setting device.

FIG. 11 illustrates a structure in which a special signal line 71 is provided between the enable/disable setting device 60 and the USB device 30, and an interface 70 is also provided especially for connecting the signal line 71. This structure is characterized by the enable/disable setting device 60 that transmits the keyboard enabling control signal 38 directly to the keyboard device 31 in the USB device 30.

With any of the above described information processing systems 1, the keyboard device 31 can be put back into the initial state (the disabled state), when the USB device 30 is connected to a PC 10 in which the driver of the keyboard device 31 has not been installed. If the USB device 30 is connected to a PC 10 in which the driver of the keyboard device 31 has already been installed, the keyboard device 31 can be put into the enabled state prior to the connection.

Figure 12:
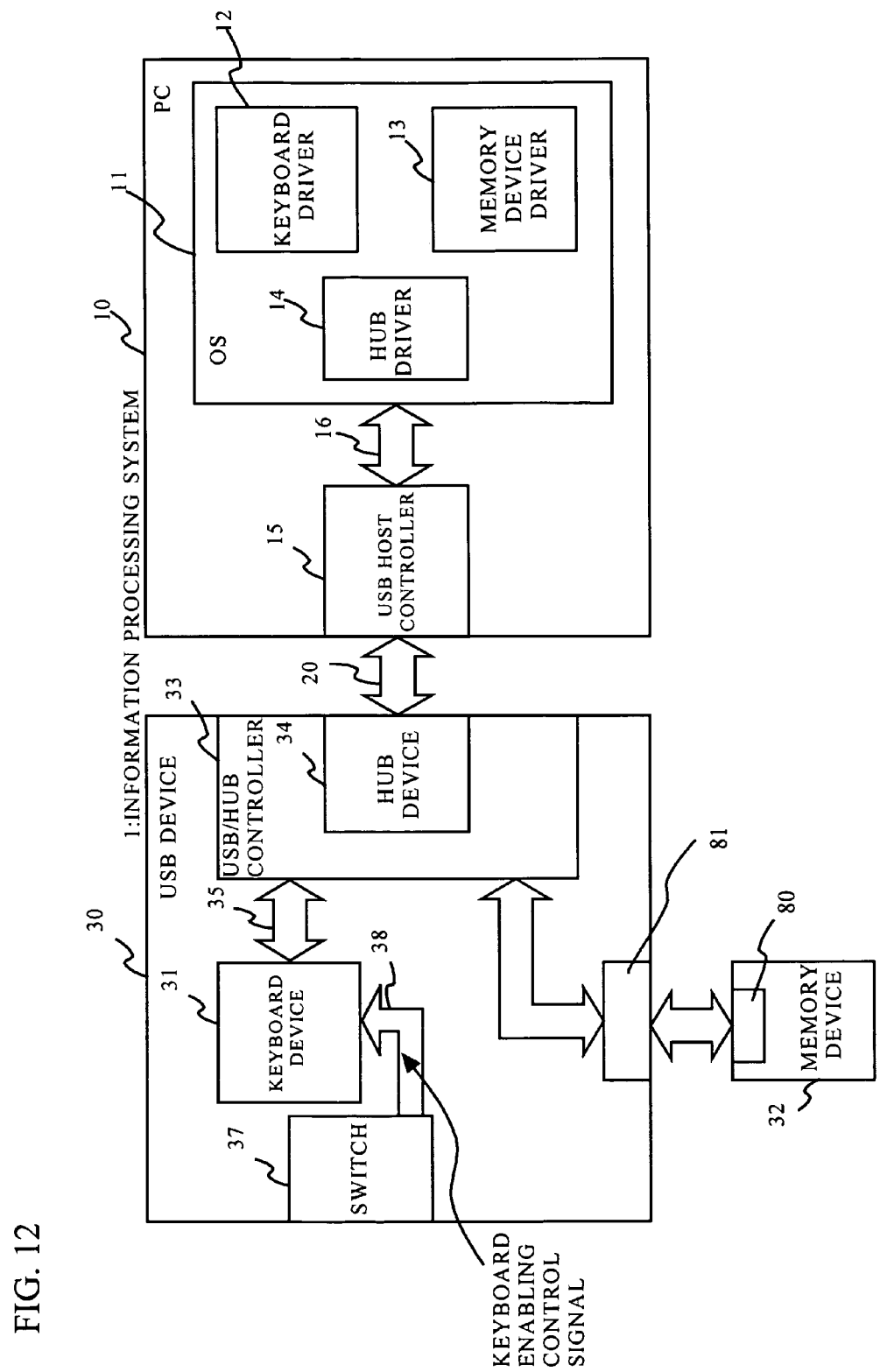
FIG. 12 shows a configuration of an electronic device having an externally connected memory device.

The memory device 32 may be provided as an external memory device 80 outside the USB device 30, as shown in FIG. 12. A connection interface 81 is provided to the USB device 30 to connect the USB device 30 and the external memory device 80, also as shown in FIG. 12.

The USB device 30 may be connected with the external memory device 80 via a network. In this case, the external memory device 80 is provided away from the USB device 30, and the driver obtained from the external memory device 80 via a network is incorporated onto the PC 10.

In this manner, the memory device 32 is employed as the external memory device 80 or via a network, allowing a common sharing of the place to store the driver.

In addition to the memory device 32 provided in the USB device 30, the external memory device 80 may be further provided. In this case, a switch is included in the USB device 30 to set whether the memory device 32 in the USB device 30 or the external memory device 80 may have priority. The external memory device 80 may have priority at the time of connection of the external memory device 80 as a trigger.

The external memory device 80 recognized as a removable disc is capable of improving the user friendliness, without affecting the system when removed. In this case, a switch is provided in the USB/HUB controller 33 so that the removable disc and the keyboard device 31 may be changed selectively or the USB/HUB controller 33 may recognize the removable disc and the keyboard device 31 as a complex device.

Second Embodiment

Next, a second embodiment of the present invention is described. The USB device 30 of this embodiment includes a multi function controller 40, as shown in FIG. 12. The multi function controller 40 includes a keyboard device 41 and a memory device 42. The keyboard device 41 and the memory device 42 exist as a physical device in the multi function controller 40. The keyboard device 41 and the memory device 42 are connected to the USB host controller 15 via the USB cable 20.

The multi function controller 40 and the switch 37 are connected to each other with a special signal line. The switch 37 is connected to the general input/output terminal or the external interrupt terminal of the multi function controller 40. The keyboard enabling control signal 38 transmitted from the switch 37 is stored in the memory status in a RAM 44 of the multi function controller 40. The keyboard device 41 analyzes the keyboard enabling control signal 38 stored in the RAM 44 through a data analysis engine 413, and switches between the enabled state and the disabled state.

Figure 13:
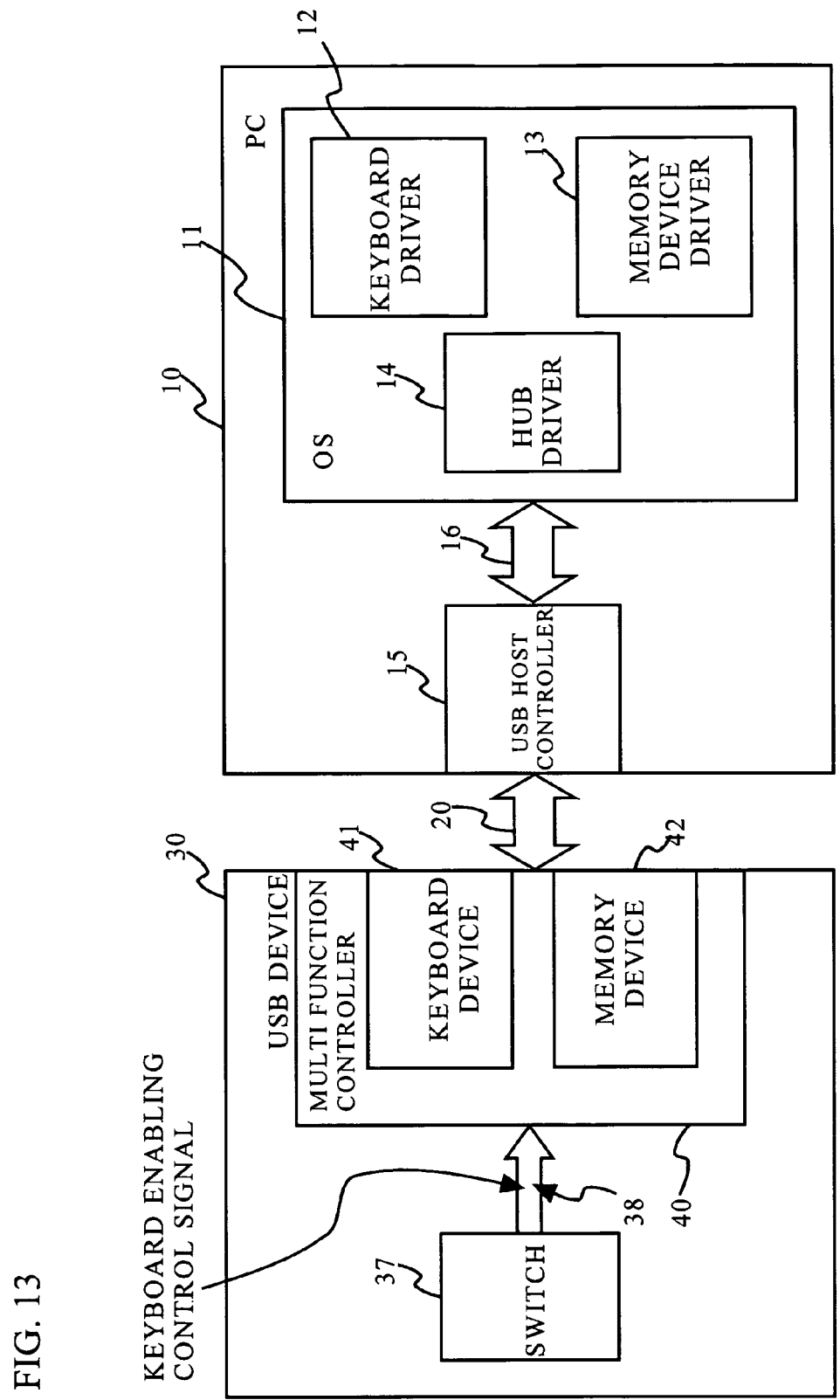
FIG. 13 is a block diagram illustrating the structure of a second embodiment of the present invention.

FIG. 13 is a block diagram illustrating an example structure of the keyboard device 41. The keyboard device 41 includes a keyboard matrix 411, a matrix scan 412, and the data analysis engine 413. The multi function controller 40 includes the RAM 44, an interface engine (IF engine) 43, a peripheral engine 46, and a ROM 45. These components are also the components of the keyboard device 41, and embody the same structure and functions as those of the keyboard device 31 shown in FIG. 5. The data analysis engine 413 of the keyboard device 41 analyzes the keyboard enabling control signal 38 stored in the RAM 44, and switches between the enabled state and the disabled state.

Figure 14:
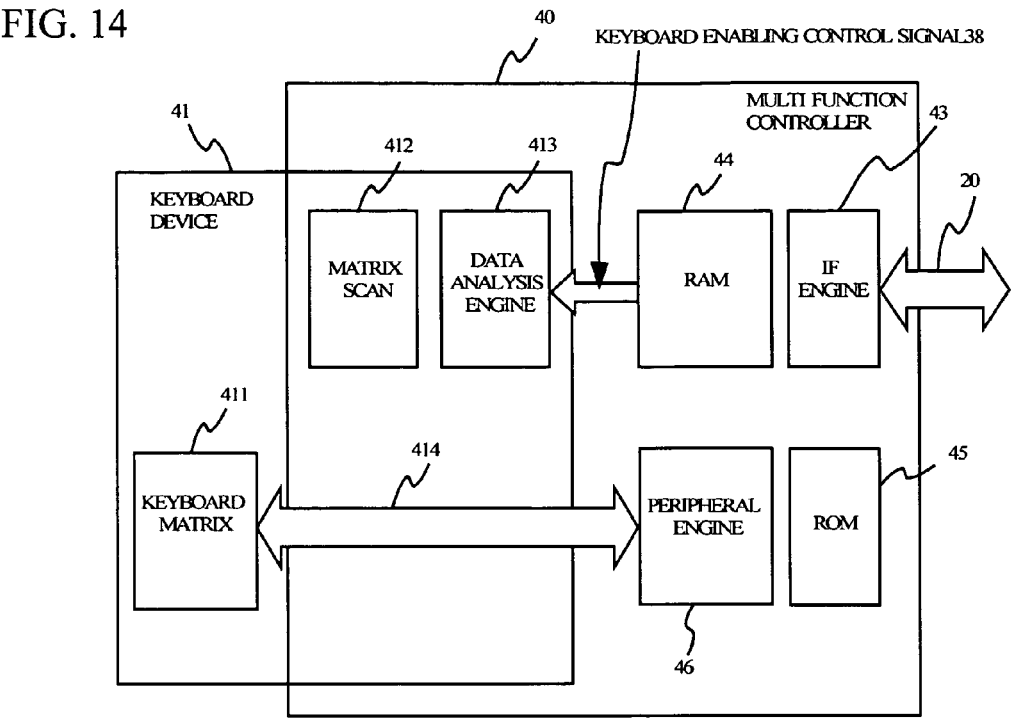
FIG. 14 is a block diagram illustrating an example structure of the keyboard device shown in FIG. 13.

FIG. 14 is a block diagram illustrating an example structure of the memory device 42. The memory device 42 includes a non-volatile memory device 421, a file system engine 422, and a data analysis engine 423. The RAM 44, the interface engine (IF engine) 43, the peripheral engine 46, and the ROM 45 of the multi function controller 40 are also the components of the memory device 42. In short, the RAM 44, the interface engine (IF engine) 43, the peripheral engine 46, and the ROM 45 are shared between the keyboard device 41 and the memory device 42. The functions of the memory device 42 are the same as the functions of the memory device 32 shown in FIG. 6.

As described above, the switch 37 outputs the keyboard enabling control signal 38 to the keyboard device 41 in this embodiment. First, the switch 37 of the USB device 30 is set so as to disable the keyboard device 41. The USB device 30 is then connected to the PC 10. After the memory device 42 starts operating as a disk drive, the switch 37 switches to the keyboard enabling state, and the keyboard device 41 starts operating. The keyboard enabling control signal 38 is then output from the switch 37. The signal is input to the multi function controller 40, and is then stored in the memory status in the RAM 44 shown in FIG. 13. After that, the keyboard device 31 is made usable, following the above described procedures.

In the above manner, the keyboard driver can be automatically incorporated into the OS. When a user is to install a driver, all he/she has to do is to connect the USB device 30 to the PC 10 to start using the USB device 30, regardless of which memory unit the driver is stored in. Thus, the user can experience "plug-and-play".

Figure 15:
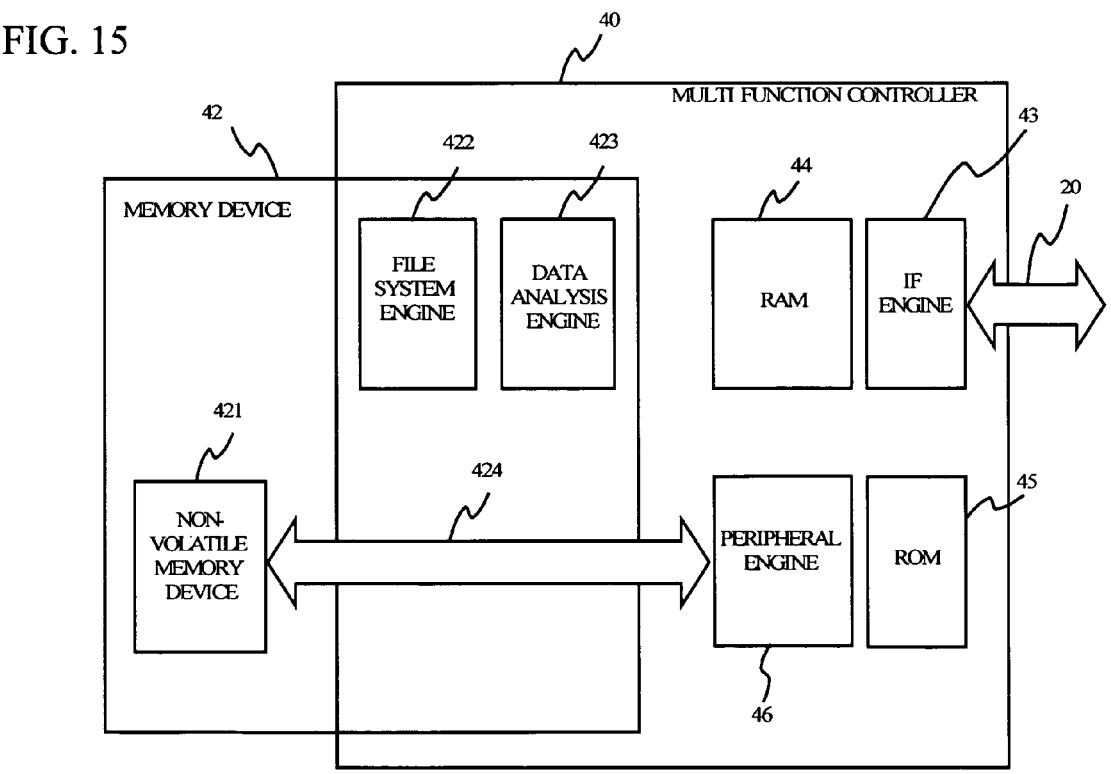
FIG. 15 is a block diagram illustrating an example structure of the memory device shown in FIG. 13.

The modifications of the first embodiment shown in FIGS. 8 through 11 can also be applied to the USB device 30 that includes the multi function controller 40. FIG. 15 illustrates a structure in which the keyboard device 41 is switched between the enabled state and the disabled state through the RFID device 50 in the USB device 30 having the multi function controller 40.

Third Embodiment

Figure 16:
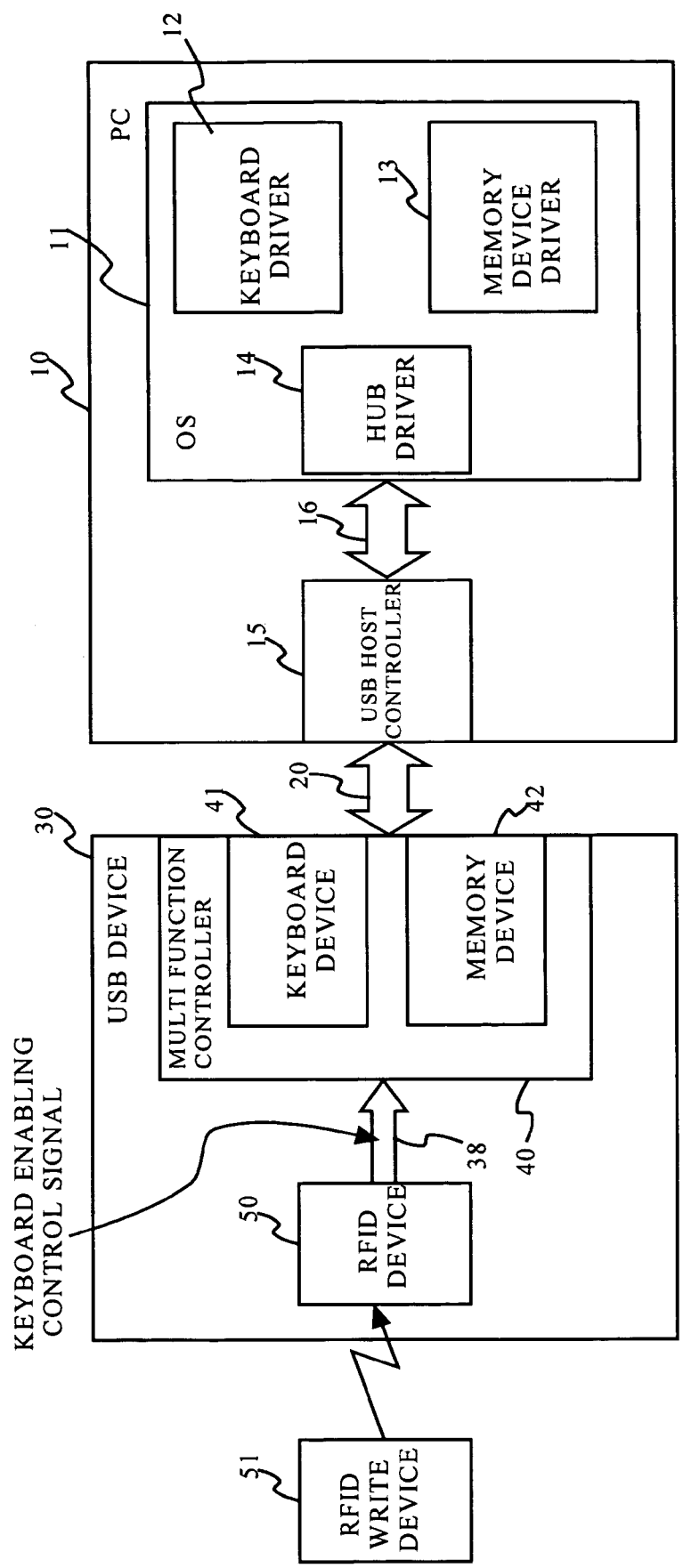
FIG. 16 illustrates a structure in which a multi function controller is mounted on the USB device and the keyboard device is switched between the enabled state and the disabled state through a RFID.

Next, a third embodiment of the present invention is described. FIG. 16 illustrates the structure of this embodiment. In this embodiment, the keyboard enabling control signal 38 from the switch 37 is also stored in the RAM 44. The keyboard device 41 analyzes the keyboard enabling control signal 38 stored in the RAM 44 with the data analysis engine 413, and switches between the enabled state and the disabled state. Likewise, the memory device 42 also analyzes the keyboard enabling control signal 38 stored in the RAM 44 with the data analysis engine 423, and switches between the enabled state and the disabled state. When the keyboard device 41 is put into the enabled state by the keyboard enabling control signal 38, the memory device 42 is put into the disabled state by a memory device disabling control signal 47.

Figure 17:
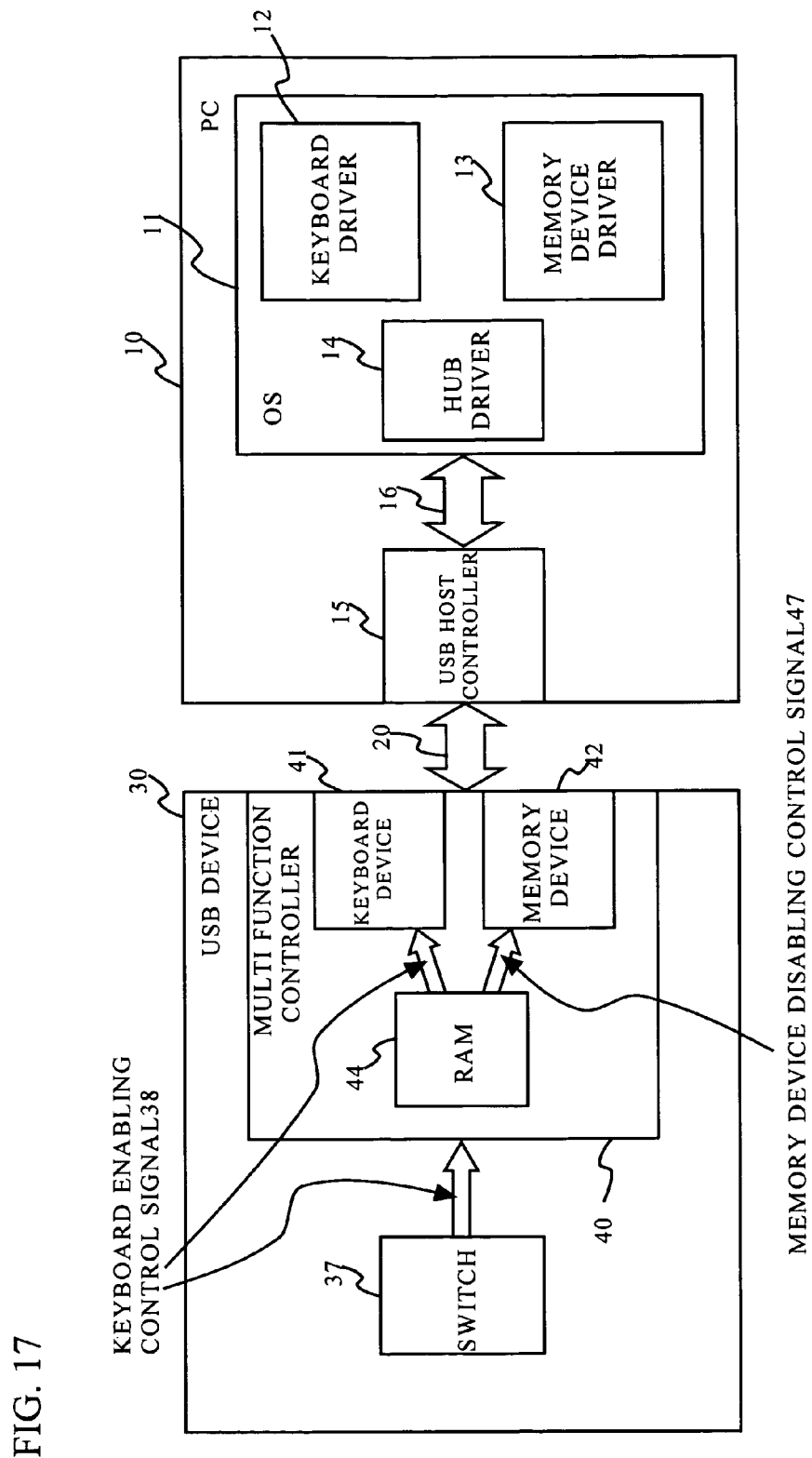
FIG. 17 is a block diagram illustrating the structure of a third embodiment of the present invention.

Referring now to the flowcharts of FIGS. 17A through 19B, the operation of this embodiment is described in detail. FIG. 17A shows the operation sequence of the USB device 30, and FIG. 17B shows the operation sequence of the PC 10. The switch 37 of the USB device 30 is first set so as to put the keyboard device 41 into the disabled state, and the USB device 30 is connected to the PC 10 (step S81). The multi function controller 40 then checks the signal level of the keyboard enabling control signal 38 (step S82). If the signal level is low, the keyboard device 41 is put into the disabled state (step S83), and the memory device 42 is put into the enabled state (step S84). The device information of the memory device 42 is read out from the ROM 45, and is written in the RAM 44. Thus, the device information is made ready to be transmitted to the PC 10 (step S85). The device information of the memory device 42 specifies that, when configured by the PC 10, the memory device 42 is configured as a CD-ROM to be activated at the start of an operation.

Figures 18A, 18B:
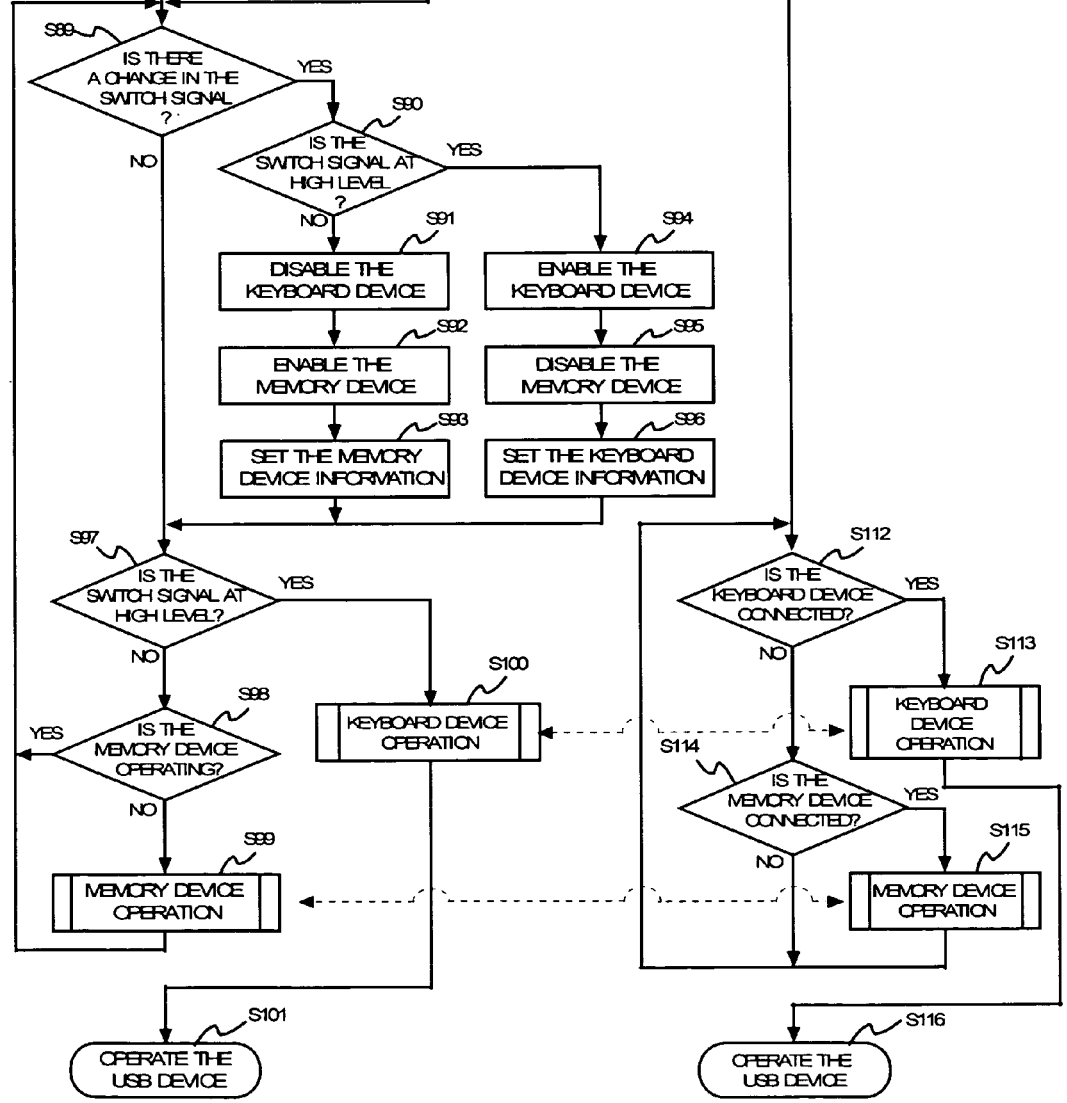
FIGS. 18A and 18B are flowcharts of the operation in accordance with the third embodiment.

Next, the multi function controller 40 checks whether there is a change in the level of the keyboard enabling control signal 38 from the switch 37 (step S89). Since there is not a change ("NO" in step S89), the signal level of the switch 37 is checked (step S97). Since the keyboard enabling control signal 38 from the switch 37 is at the low level ("NO" in step S97), whether the memory device 42 is operating is determined (step S98). Since the memory device 42 has not been configured yet, the operation moves on to a memory device operation (step S99). FIGS. 18A and 18B illustrate the memory device operation. When the memory device 42 is detected (step S131), the memory device 42 is configured by the memory device driver 13 incorporated into the OS (step S132). Since the memory device information specifies that the memory device 42 is a CD-ROM, the PC 10 configures the memory device 42 as a CD-ROM.

The memory device 42 is stored beforehand in the USB device 30 in such a manner that the installer for the keyboard driver is activated when the memory device 42 starts operating as a CD-ROM. When the memory device 42 actually starts operating as a CD-ROM (steps S122, S133), the installer for the keyboard device driver is automatically activated (step S134). With the installer, the keyboard device driver is read out from the memory device 42, and is copied into the PC 10 (step S135). After that, the checking of the signal level of the keyboard enabling control signal 38 from the switch 37 is repeated (step S89).

Figure 19A:
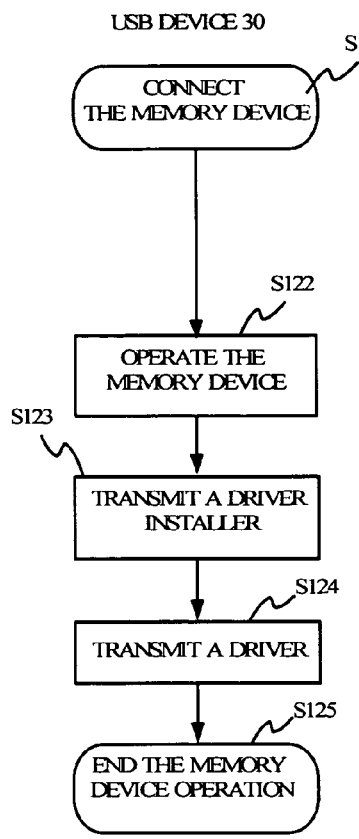
FIGS. 19A and 19B are flowcharts of the procedures for configuring the memory device.
Figure 19B:
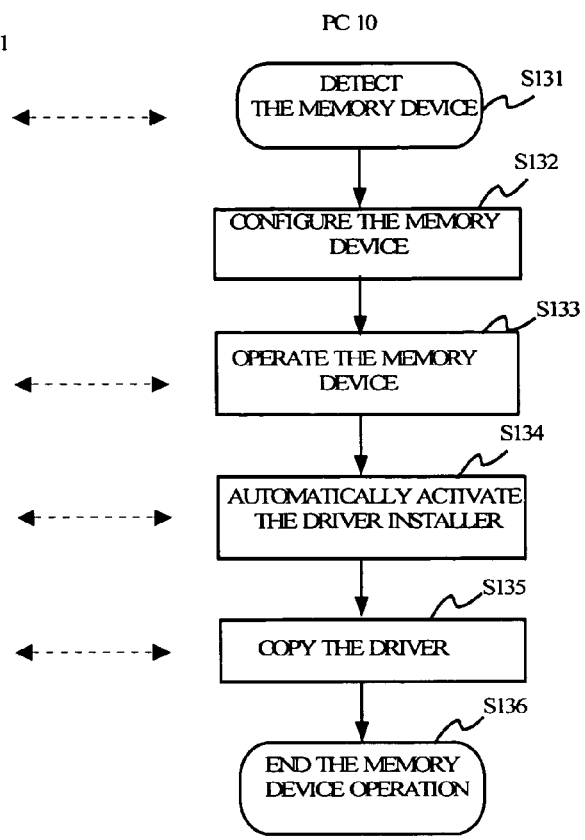

When the keyboard enabling control signal 38 from the switch 37 is switched to the keyboard enabling state or the memory device disabling state, the change in the signal level of the switch 37 is detected ("YES" in step S89). The signal level of the switch 37 is then checked (step S90). If the keyboard enabling control signal 38 is at the high level ("YES" in step S90), the keyboard device 41 is enabled (step S94), and the memory device 42 is disabled (step S95). The device information of the keyboard device 41 is then copied from the ROM 45 to the RAM 44. Thus, the device information is made ready for transmission. When the signal level of the switch 37 is checked again, the keyboard enabling control signal 38 is at the high level ("YES" in step 97). Accordingly, the operation moves on to a keyboard device operation (steps S100, S113). FIGS. 19A and 19B illustrate the keyboard device operation.

In the keyboard device operation shown in FIGS. 19A and 19B, the keyboard device 41 starts operating upon receipt of the keyboard enabling control signal 38 from the switch 37, and the device information to be transmitted specifies the keyboard device 41. Accordingly, the PC 10 detects the unknown keyboard device 41 (step S151). The keyboard driver that is copied in the driver copying step (step S135 in FIG. 18B) is read out from a memory device (not shown) in the PC 10, and the keyboard device 41 is configured (step S153).

In the above manner, the keyboard driver can be automatically incorporated into the OS. When a user is to install a driver, all he/she has to do is to connect the USB device 30 to the PC 10 to start using the USB device 30, regardless of which memory unit the driver is stored in. Thus, the user can experience "plug-and-play".

Fourth Embodiment

Figure 20A:
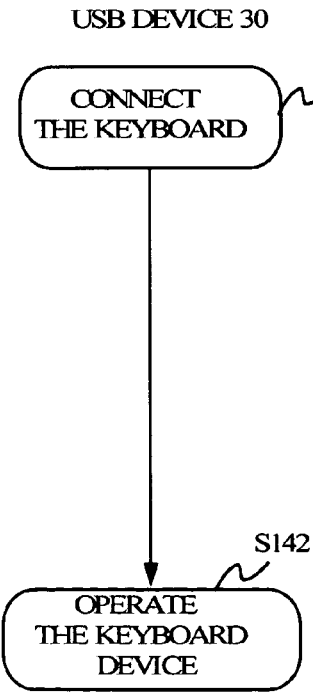
FIGS. 20A and 20B are flowcharts of the procedures for configuring the keyboard device.
Figure 20B:
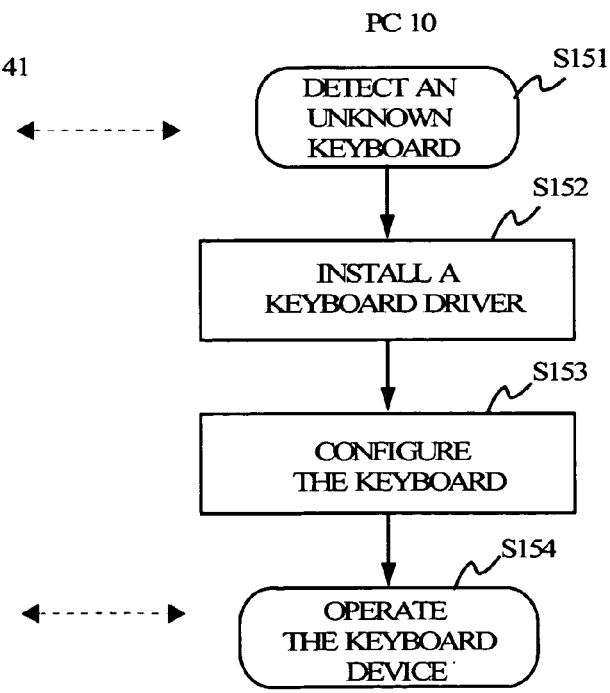

Next, a fourth embodiment of the present invention is described. In this embodiment, the keyboard device 41 and the memory device 42 are incorporated into the multi function controller 40, as shown in FIG. 20. In this structure, the keyboard device 41 and the memory device 42 are switched between the enabled state and the disabled state by the memory device 42, instead of the switch 37.

Figure 21:
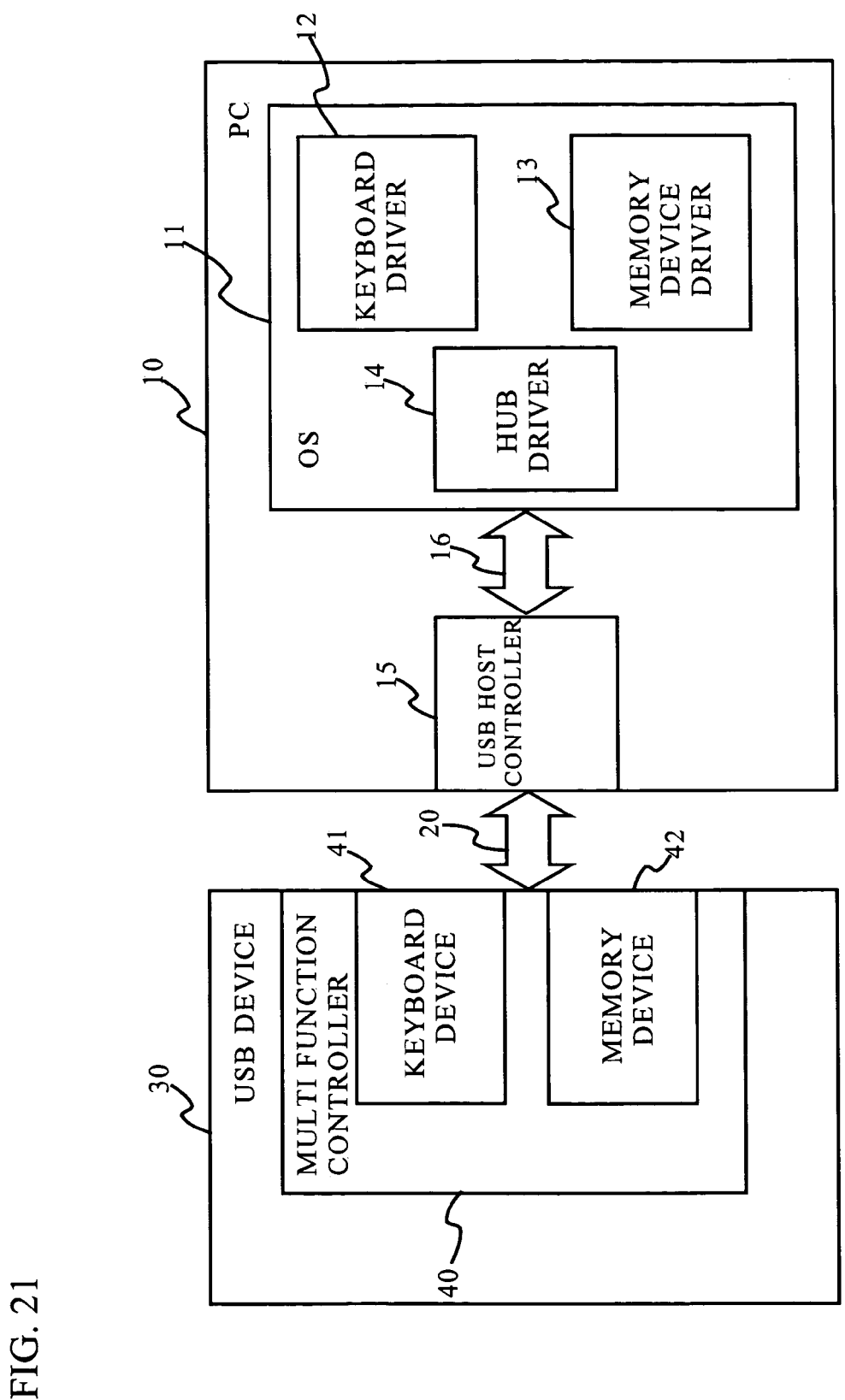
FIG. 21 is a block diagram illustrating the structure of a fourth embodiment of the present invention.
Figure 22:
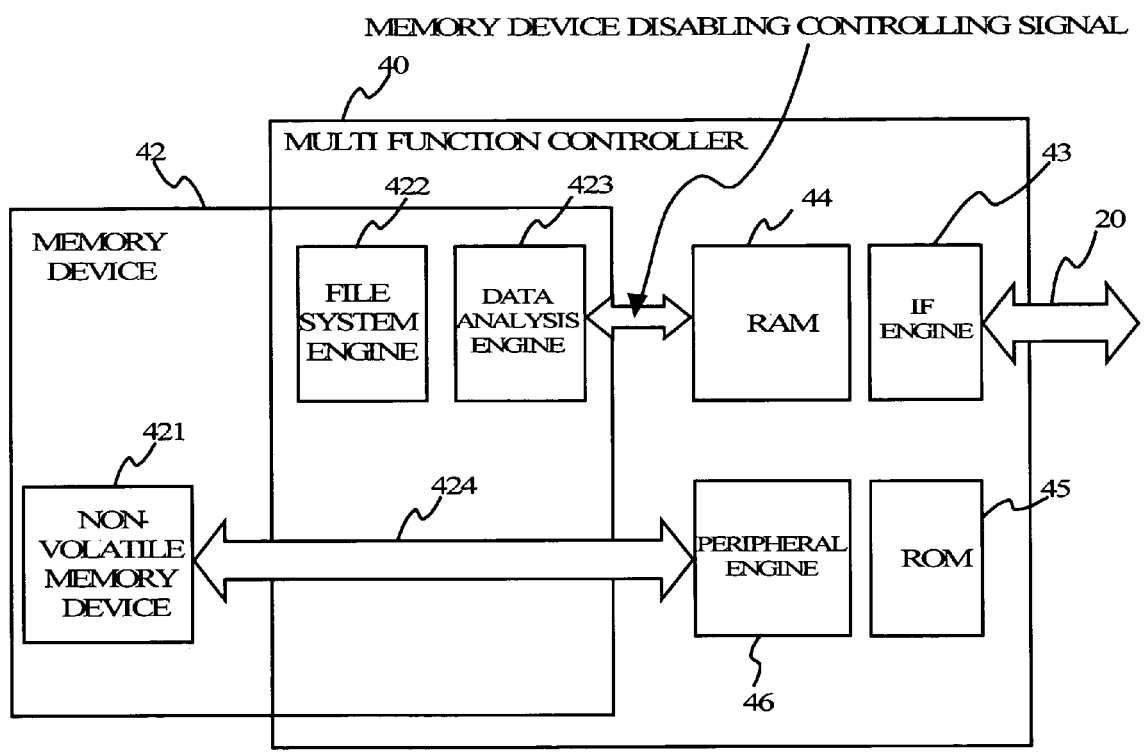
FIG. 22 illustrates the structures of the multi function controller and the memory device, and signals transmitted and received between the devices.

Referring now to the flowcharts of FIGS. 22A and 22B, the operation of this embodiment is described in detail. FIG. 22A shows the operation sequence of the USB device 30, and FIG. 22B shows the operation sequence of the PC 10. In the initial state, the keyboard device 41 of the USB device 30 is in the disabled state, and the memory device 42 is in the enabled state. When the USB device 30 is connected to the PC 10 (step S161), the multi function controller 40 reads the keyboard enabling control signal 38 from the non-volatile memory device 421 (shown in FIG. 21) of the memory device 42 via the peripheral engine 46, and stores the signal in the RAM 44. In accordance with the signal level, the keyboard device 41 and the memory device 42 are put into the enabled state or the disabled state. FIG. 13 illustrates the structure in which keyboard enabling control signal 38 stored in the RAM 44 is analyzed by the data analysis engine 413 to determine the state of the keyboard device 41. FIG. 21 illustrates the structure in which the keyboard enabling control signal 38 stored in the RAM 44 is analyzed by the data analysis engine 423 to determine the state of the memory device 42.

In the initial state, the keyboard enabling control signal 38 is at the low level ("NO" in step S162), the keyboard device 41 is put into the disabled state, and the memory device 42 is put into the enabled state. The device information of the memory device 42 is read out from the ROM 45, and is copied into the RAM 44. Thus, the device information is made ready for readout from the PC 10 (step S163). When the copying of the device information is completed, the memory device 42 starts operating, and the PC 10 detects the memory device 42 (step S182). In the same manner as in the first embodiment, the memory device 42 is configured by the memory device driver 13 that is incorporated into the OS (step S183). The memory device 42 then operates as a disk drive (step S184). Here, the memory device 42 is configured as a CD-ROM as in the third embodiment. As the memory device 42 starts operating as a CD-ROM, the installer for the keyboard driver is automatically activated (steps S166, S185). The keyboard driver is read out from the memory device 42 through the installer (step S167), and is copied in the PC 10 (step S186). The memory device 42 detects that the copying of the keyboard driver is completed ("YES" in step S168), and outputs the memory device disabling control signal 47 and the keyboard enabling control signal 38 to the multi function controller 40 (step S169).

Upon receipt of the memory device disabling control signal 47 and the keyboard enabling control signal 38, the multi function controller 40 puts the memory device 42 into the disabled state, and reads the device information of the keyboard device 41 from the ROM 45 and copies the device information into the RAM 44 (step S170). The multi function controller 40 then puts the keyboard device 41 into the enabled state (step S171). As a result, the PC 10 detects the unknown keyboard device 41 (steps S172, S187). The keyboard driver that is copied in the driver copying step is then read out from the memory device (not shown) in the PC 10 (step S188), and the keyboard device 41 is configured (step S189). The configured keyboard device 41 then starts operating (steps S173, S190).

In the above manner, the keyboard driver can be automatically incorporated into the OS. When a user is to install a driver, all he/she has to do is to connect the USB device 30 to the PC 10 to start using the USB device 30, regardless of which memory unit the driver is stored in. Thus, the user can experience "plug-and-play".

The signal level of the keyboard enabling control signal 38 is checked (step S162). If the signal is at the high level, the USB device 30 is considered to have been connected to the PC 10 at least once. As a result, the keyboard device 41 is put into the enabled state, and the memory device 42 is put into the disabled state. The device information of the keyboard device 41 is read out from the ROM 45, and is copied into the RAM 44. After that, keyboard connection is performed, and the keyboard device 41 is configured.

In the flowcharts of FIGS. 22A and 22B, if the USB device 30 has once been connected to the PC 10, the USB device 30 operates as the keyboard device 41, and the memory device 42 never operates. When the USB device 30 that has been connected to the PC 10 is connected to another PC 10 to which the USB device 30 has not been connected, the USB device 30 is detected as an unknown keyboard device. In such a case, driver installation is requested, because a driver does not exist in the memory device in the PC 10. As a result, automatic installation cannot be performed. Therefore, it is necessary to initialize the USB device 30, so as to perform automatic installation.

To counter this problem and eliminate the process of initializing the USB device 30, different configuring procedures are set in the memory device driver 13 that is to configure the memory device 42 and is incorporated into the OS, and the keyboard driver 12 that is to configure the keyboard device 41. Those configuring procedures vary within such a range that does not affect the configurations in accordance with the USB standard. Whether the USB device 30 is configured by the memory device driver 13 or the keyboard driver 12 is then determined. The device information of the detected device is read out from the ROM 45 in such timing that does not affect the configurations in accordance with the USB standard. The device information is copied into the RAM 44 and is transmitted to the PC 10. By doing so, the driver for the keyboard device 41 is automatically installed in the PC 10 to which the USB device 30 has not been connected. In the case of the PC 10 to which the USB device 30 has been connected, the USB device 30 can operate as a keyboard.

In this embodiment, so as to eliminate the process of initializing the USB device 30 through the switch 37 or the like, the configuration procedures stored in the memory device driver 13 that is to configure the memory device 42 and is incorporated into the OS, and the keyboard driver 12 that is to configure the keyboard device 41, are different within such a range that does not affect the configurations specified in accordance with the USB standard.

Whether the memory device 42 is configured by the memory device driver 13 or the USB device is configured by the keyboard driver 12 is then determined. The device information of the detected device is read out from the ROM 45 in such timing that does not affect the configurations in accordance with the USB standard. The device information is copied into the RAM 44 and is transmitted to the PC 10. By doing so, the driver for the keyboard device 41 is automatically installed in the PC 10 to which the USB device 30 has not been connected. In the case of the PC 10 to which the USB device 30 has been connected, the USB device 30 can operate as the keyboard device 41.

Referring now to FIGS. 23A through 24B, the general procedures for configuring the USB device 30 are described in detail. FIGS. 23A and 23B illustrate the configuring procedures to be carried out by the USB device 30 and the PC 10. When detecting the USB device 30 (step S211), the PC 10 requests the USB device 30 to transmit a "Device Descriptor" (step S212). So as to obtain the maximum packet size in USB communications, a request for a "Device Descriptor", is sent to a global address. In response to the request, the USB device 30 transmits a "Device Descriptor" to the PC 10 (step S202). Upon receipt of the "Device Descriptor", the PC 10 resets the port (step S213), and the USB device 30 is also reset (step S203).

Next, the PC 10 outputs a request for "Descriptors" to the USB device 30 (step S214). This request is made so as to read out all the "Descriptors" for the OS to search for a driver. In response to this request, the USB device 30 transmits the "Descriptors" to the PC 10 (step S204). The operations for transmission and reception of the "Descriptors" are described later.

Having obtained the "Descriptors", the PC 10 searches for a driver (step S215), and loads the driver therein (step S216). With the driver, a request for "Descriptors" is again output to the USB device 30 (step S217). In response to this request, the USB device 30 transmits the "Descriptors" (step S205), and the configuring operation comes to an end (step S218). The operations for transmission and reception of the "Descriptors" are shown in the flowcharts of steps S204 and S214, and are later described in detail.

As described above, so as to obtain the maximum packet size in USB communications, a request for a "Device Descriptor" is sent to a global address once, is again output when all the "Descriptors" are read out for the OS to search for a driver, and is then output by the driver for the third time. The request is normally made three times in total. However, there are cases where a request for a "Class Descriptor" is output when the "Device Descriptor" is the same as the "Class Descriptor", as with the HUB class.

Figure 24A:
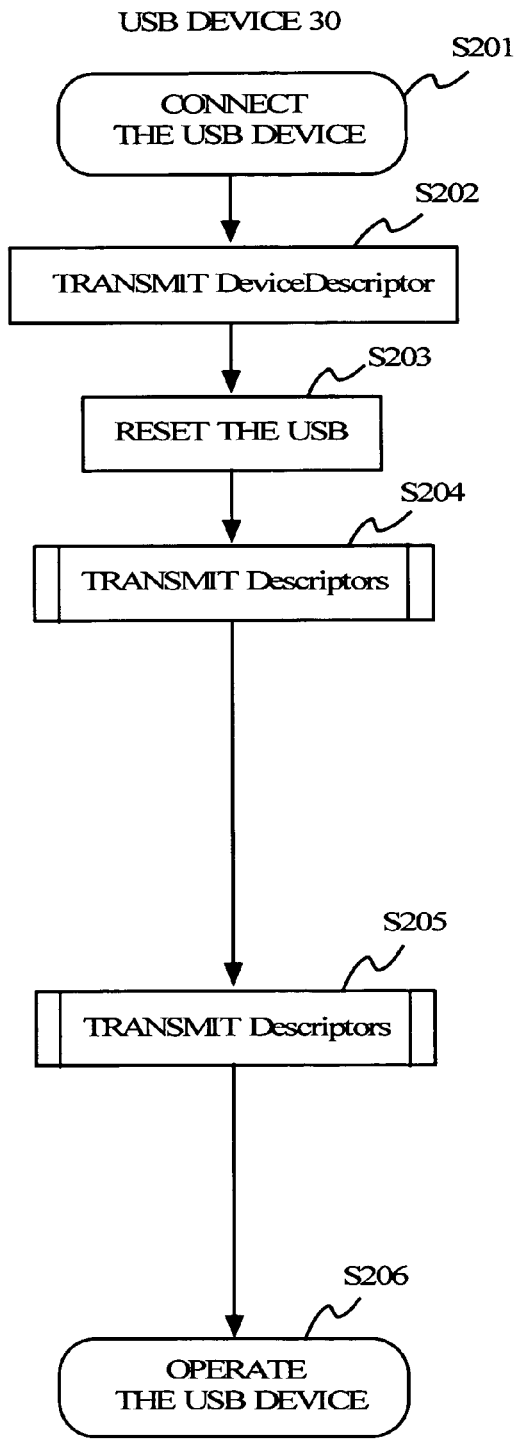
FIGS. 24A and 24B are flowcharts of the general procedures for configuring the USB device.
Figure 24B:
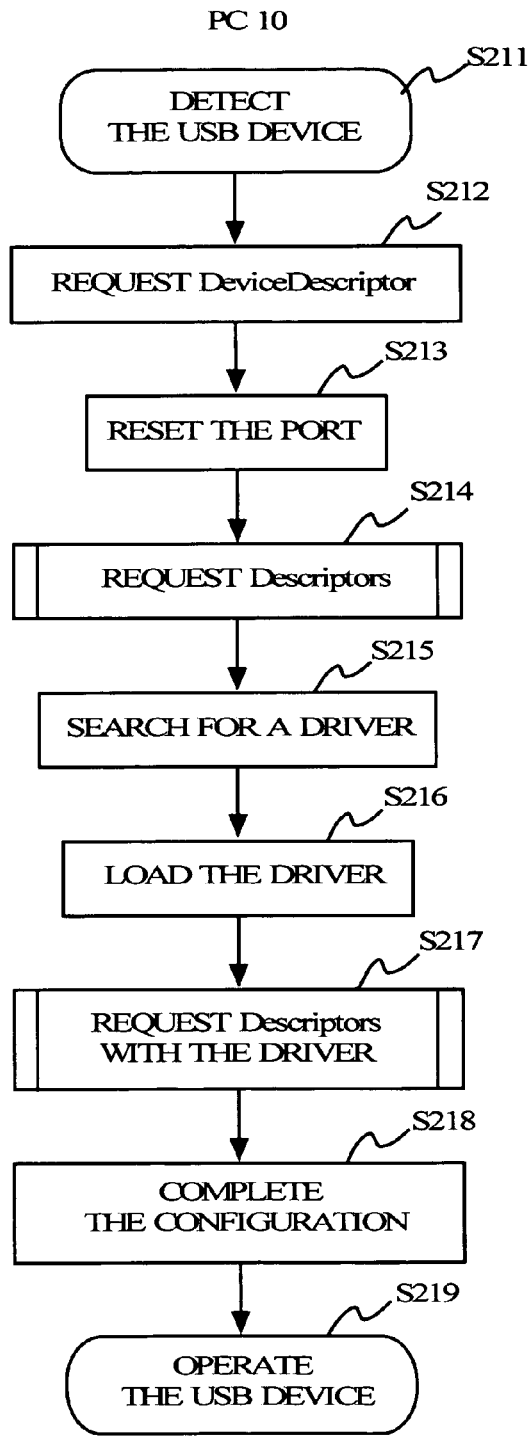

Referring now to FIGS. 24A and 24B, the operation to be performed from the start of a request for "Descriptors" to reception of the request is described. When a request for "Descriptors" starts (S231), the PC 10 outputs a request for a "Device Descriptor" to the USB device 30 (step S232). In response to this request, the USB device 30 transmits a "Device Descriptor" to the PC 10 (step S222). The PC 10 then outputs a request for a "Configuration Descriptor" to the USB device 30 (step S233). In response to this request, the USB device 30 transmits a "Configuration Descriptor" to the PC 10 (step S223). The PC 10 next outputs a request for "Configuration-Endpoint Descriptors" to the USB device 30 (step S234). The request for "Configuration-Endpoint Descriptors" is made so as to collectively obtain a "Configuration Descriptor", an "Interface Descriptor", a "Class Descriptor", and an "Endpoint Descriptor". In response to this request, the USB device 30 transmits the above "Descriptors" to the PC 10 (step S224). Lastly, the PC 10 outputs a request for a "String Descriptor" to the USB device 30 (step S235). In response to this request, the USB device 30 transmits a "String Descriptor" to the PC 10 (step S225), and the "Descriptor" transmitting operation comes to an end. In the flowcharts shown in FIGS. 24A and 24B, the request for a "String Descriptor" is made only once, but may be output more than once, depending on the structure of the device.

Next, the operation of this embodiment is described. Since the number of times a request for a "Device Descriptor" is made is constant, the request for a "Device Descriptor" is output intentionally more than once with the keyboard driver in this embodiment. In the USB device 30, the number of times a "Device Descriptor" is read out is counted, so as to determine whether the USB device 30 is configured by the memory device driver 13 or the keyboard driver 12 incorporated into the OS.

Figure 25A:
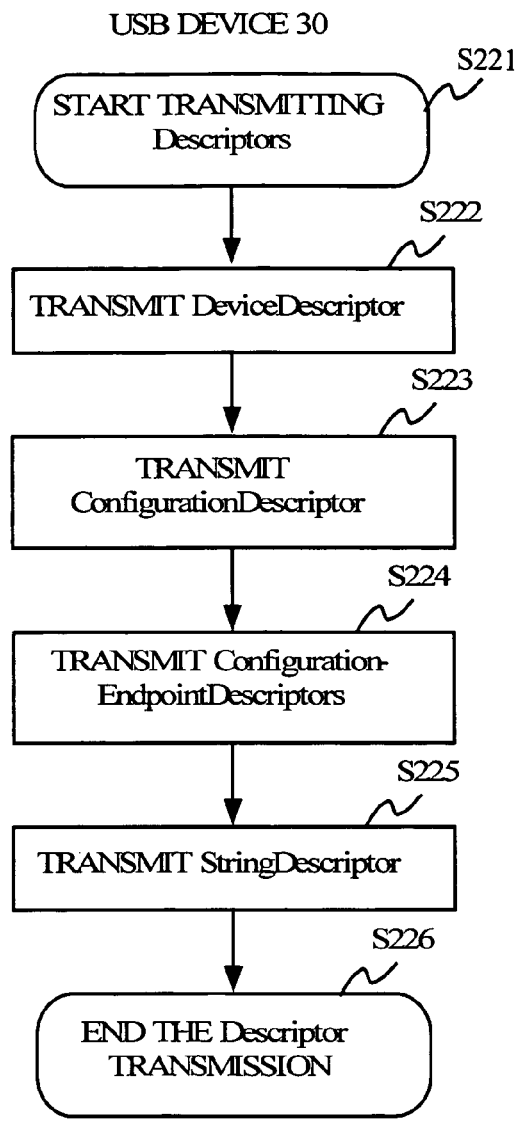
FIGS. 25A and 25B are flowcharts of the general procedures for configuring the USB device.
Figure 25B:
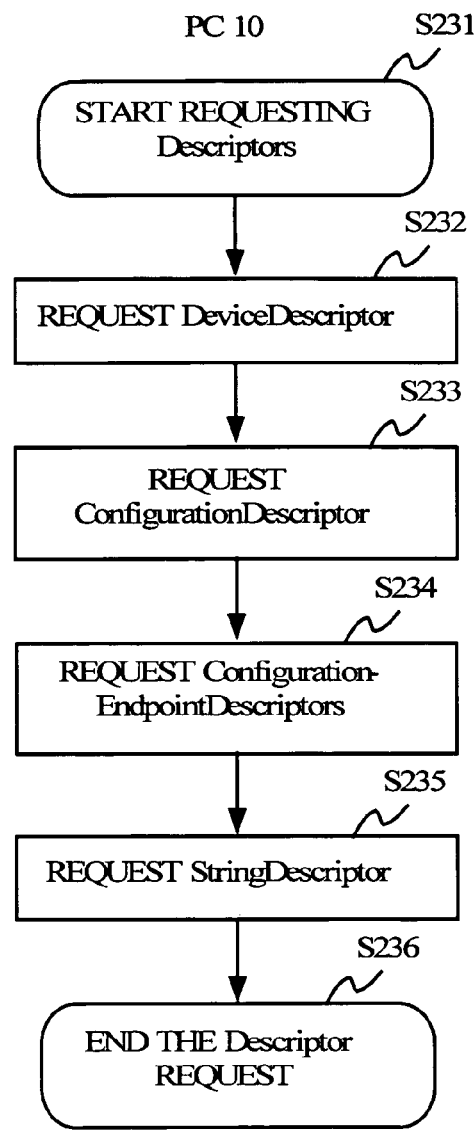
Figure 26A:
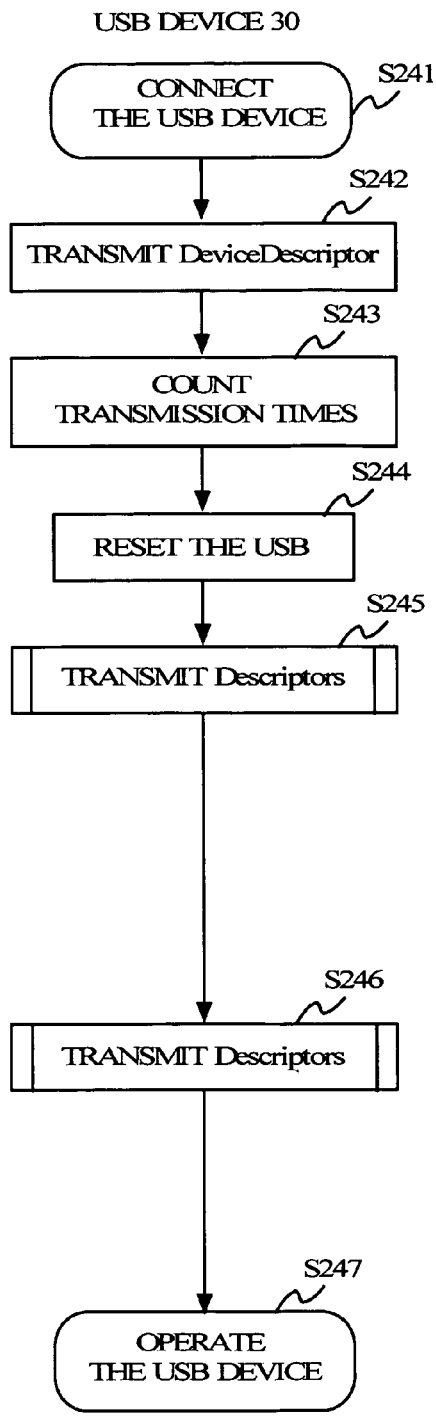
FIGS. 26A and 26B are flowcharts of the configuring procedures in accordance with the present invention.
Figure 26B:
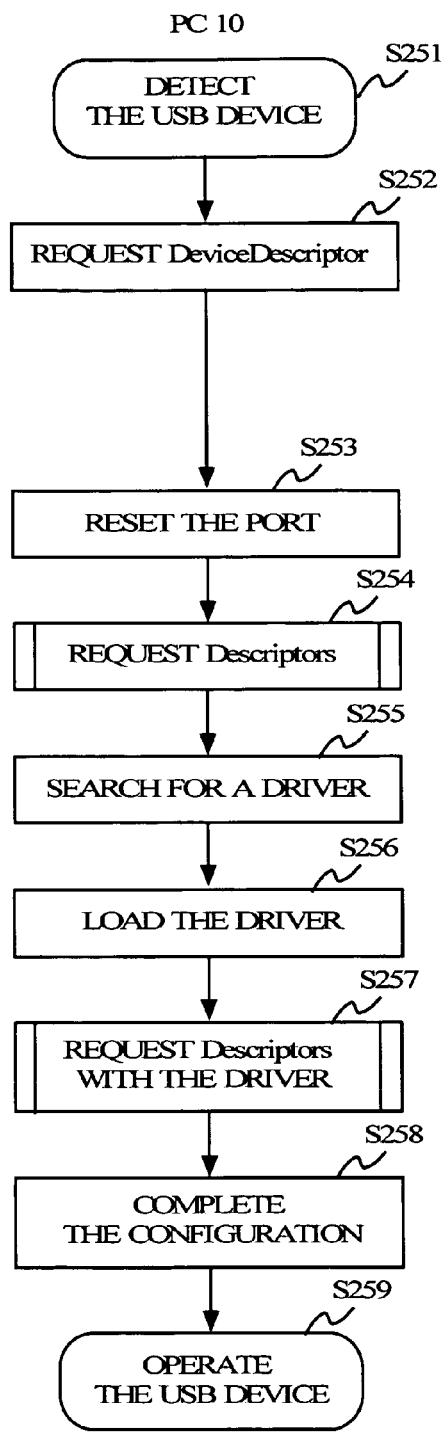
Figure 27A:
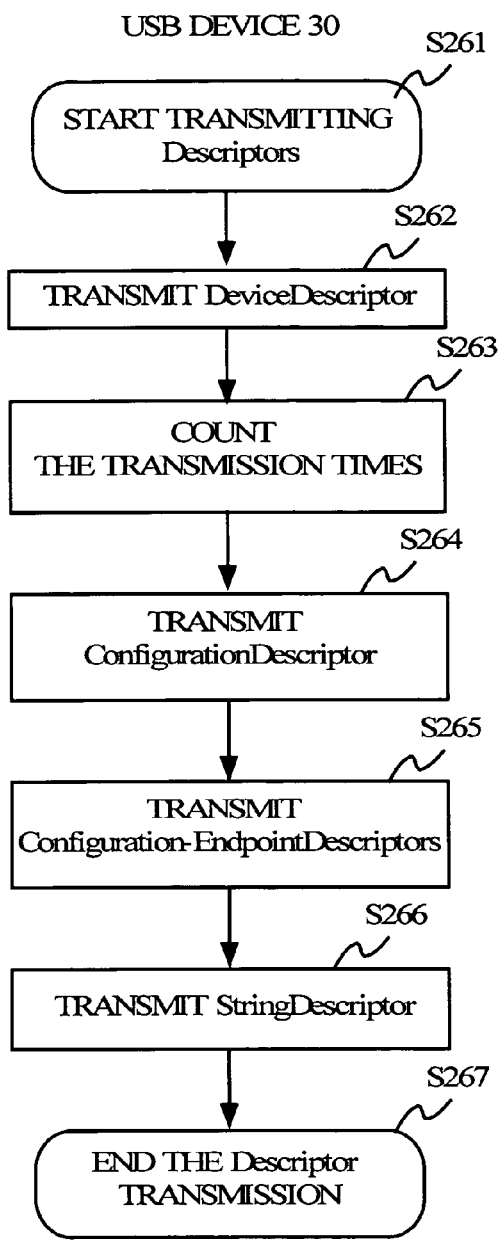
FIGS. 27A and 27B are flowcharts of the procedures for requesting and transmitting Descriptors.
Figure 27B:
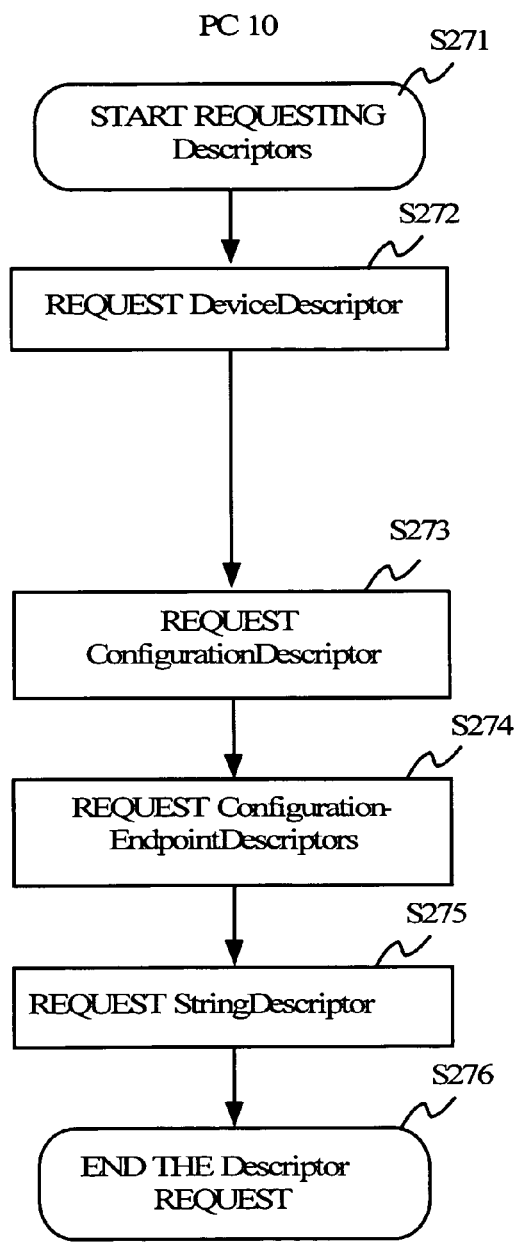
Figure 28A:
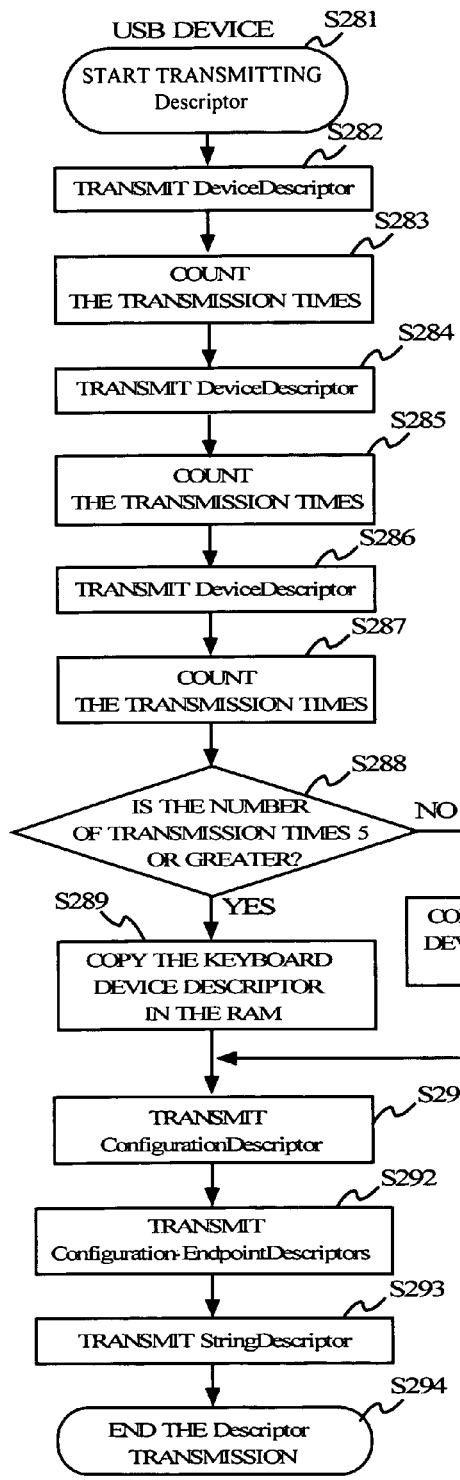
FIGS. 28A and 28B are flowcharts of the procedures for requesting and transmitting Descriptors.
Figure 28B:
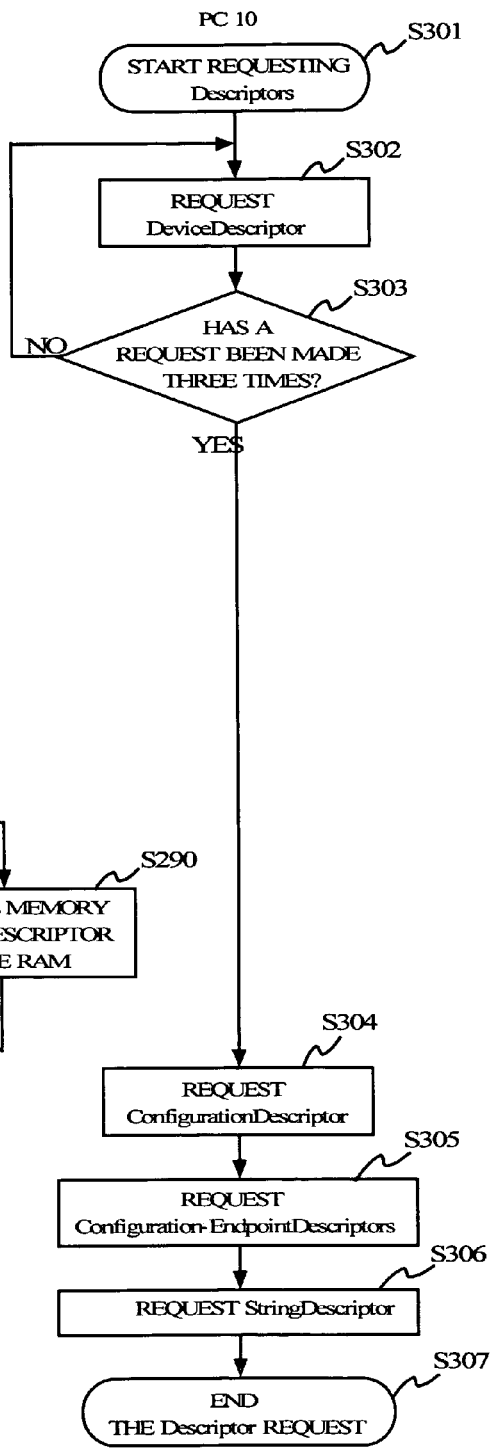

FIGS. 25A and 25B illustrate the configuring procedures in accordance with this embodiment. FIGS. 26A and 26B illustrate the procedures for requesting and transmitting "Descriptors" in steps S245 and S254 of FIGS. 25A and 25B. FIGS. 27A and 27B illustrate the procedures for requesting and transmitting "Descriptors" by the keyboard driver 12 in steps S246 and S257 of FIGS. 25A and 25B.

As shown in FIGS. 25A and 25B, when detecting the USB device 30 (step S251), the PC 10 requests the USB device 30 to transmit a "Device Descriptor" (step S252). In accordance with the request from the PC 10, the USB device 30 transmits a "Device Descriptor" (step S242), and counts the number of times a "Device Descriptor" is transmitted (step S243). Upon receipt of a "Device Descriptor", the PC 10 rests the port (step S253). The USB device 30 is also reset (step S244).

Next, the PC 10 outputs a request for "Descriptors" to the USB device 30 (step S254). This request is made so as to read out all the "Descriptors" for the OS to search for a driver. In response to this request, the USB device 30 transmits "Descriptors" to the PC 10 (step S245). The operations for transmission and reception of "Descriptors" are described later.

Receiving the "Descriptors", the PC 10 searches for a driver (step S255), and loads the driver therein (step S256). With the driver, the request for "Descriptors" is again output to the USB device 30 (step S257). In response to this request, the USB device 30 transmits "Descriptors" (step S246), and the configuring operation comes to an end (step S258). The operations for transmission and reception of "Descriptors" in steps S246 and 257 are also described later.

Referring now to FIGS. 26A and 26B, the procedures of steps S254 and 245 for transmitting and receiving "Descriptors" are described. When a request for "Descriptors" starts (step S271), the PC 10 requests the USB device 30 to transmit a "Device Description" (step S272). In response to this request, the USB device 30 transmits a "Device Descriptor" to the PC 10 (step S262), and counts the number of times a "Device Descriptor" is transmitted (step S263).

Receiving a "Device Descriptor", the PC 10 requests the USB device 30 to transmit a "Configuration Descriptor" (step S273). In response to this request, the USB device 30 transmits a "Configuration Descriptor" to the PC 10 (step S264). The PC 10 next outputs a request for "Configuration-Endpoint Descriptors" to the USB device 30 (step S274). The request for "Configuration-Endpoint Descriptors" is made so as to collectively obtain a "Configuration Descriptor", an "Interface Descriptor", a "Class Descriptor", and an "Endpoint Descriptor". In response to this request, the USB device 30 transmits the above "Descriptors" to the PC 10 (step S265). Lastly, the PC 10 outputs a request for a "String Descriptor" to the USB device 30 (step S275). In response to this request, the USB device 30 transmits a "String Descriptor" to the PC 10 (step S266), and the "Descriptor" transmitting operation comes to an end. In the flowcharts shown in FIGS. 26A and 26B, the request for a "String Descriptor" is made only once, but may be output more than once, depending on the structure of the device.

Referring now to FIGS. 27A and 27B, the procedures of steps S246 and S257 for requesting and transmitting "Descriptors" with the keyboard driver 12 are described. When a request for "Descriptors" starts (step S301), the PC 10 outputs a request for a "Device Descriptor" three times in a row (steps S302, S303). In response to the request for a "Device Descriptor" from the PC 10, the USB device 30 transmits a "Device Descriptor" to the PC 10 (steps S282, S284, S286), and counts the number of times a "Device Descriptor" is transmitted (steps S283, S285, S287). When the number of times a "Device Descriptor" is transmitted becomes five or greater ("YES" in step S288), the USB device 30 determines that the configuration is done by the keyboard driver 12, and reads out the device information of the keyboard device 41 from the ROM 45 and copies the device information in the RAM 44. A "Device Descriptor" is transmitted once in step S242, once again in step S245, and three times in step S246. Accordingly, the total number of times a "Device Descriptor" is transmitted becomes five.

If the number of transmission times is smaller than five in step S288, the configuration is determined to be done by the memory device driver 13, and the device information of the memory device 42 is read out from the ROM 45 and is copied in the RAM 44 (step S290). After that, in accordance with a request from the PC 10, the USB device 30 transmits a "Configuration Descriptor" (step S304), "Configuration-Endpoint Descriptors" (step S305), and a "String Descriptor" (step S306) to the PC 10 (steps S291, S292, S293). Accordingly, the USB device 30 can switch between the memory device 42 and the keyboard device 41, without affecting the configuration in accordance with the USB standard. Although the number of times a "Device Descriptor" is transmitted is counted in the flowcharts shown in FIGS. 27A and 27B, it is also possible to count the number of times a "Configuration Descriptor" is transmitted.

As another example of the above-mentioned procedure, the USB device 30 may selectively change the enabled state and the disabled state of the keyboard device 31 and memory device 32, according to the vender request from the PC 10. This procedure will be described with reference to flowcharts shown in FIGS. 29A and 29B. The PC 10 starts transmitting "Descriptor" requests, and first requests the USB device 30 for a "Device Descriptor" (step S321). The USB device 30 transmits the "Device Descriptor" to the PC 10 (step S311). Then, the PC 10 requests the vendor request to the USB device 30 in process of the configuration (step S322). If the USB device 30 accepts the vendor request from the PC 10 ("Yes" in step S312), it is judged that the driver has been installed and the keyboard device 31 is enabled as the first device.

If the PC 10 does not transmit the vendor request during the configuration procedures ("No" in step S312), the memory device 32 is enabled (step S314) to read out the driver from the memory device 32 to install in the PC 10.

The PC 10 requests the USB device 30 for a "Configuration Descriptor" (step S323). In response to this request, the USB device 30 and transmits a "Configuration Descriptor" to the PC 10 (step S316). The PC 10 next outputs a transmission request for of a "Configuration-Endpoint Descriptor" to the USB device 30 (step S324). The request for "Configuration-Endpoint Descriptors" is made so as to collectively obtain a "Configuration Descriptor", an "Interface Descriptor", a "Class Descriptor", and an "Endpoint Descriptor". In response to this request, the USB device 30 transmits the above "Descriptors" to the PC 10 (step S317). Lastly, the PC 10 outputs a request for a "String Descriptor" to the USB device 30 (step S325). In response to this request, the USB device 30 transmits a "String Descriptor" to the PC 10 (step S318), and the "Descriptor" transmitting operation comes to an end.

In this manner, the enabled state and the disabled state of the keyboard device 31 and the memory device 32 can be changed selectively without changing the sequence of the general configuration in accordance with the this embodiment.

Fifth Embodiment

Figure 30:
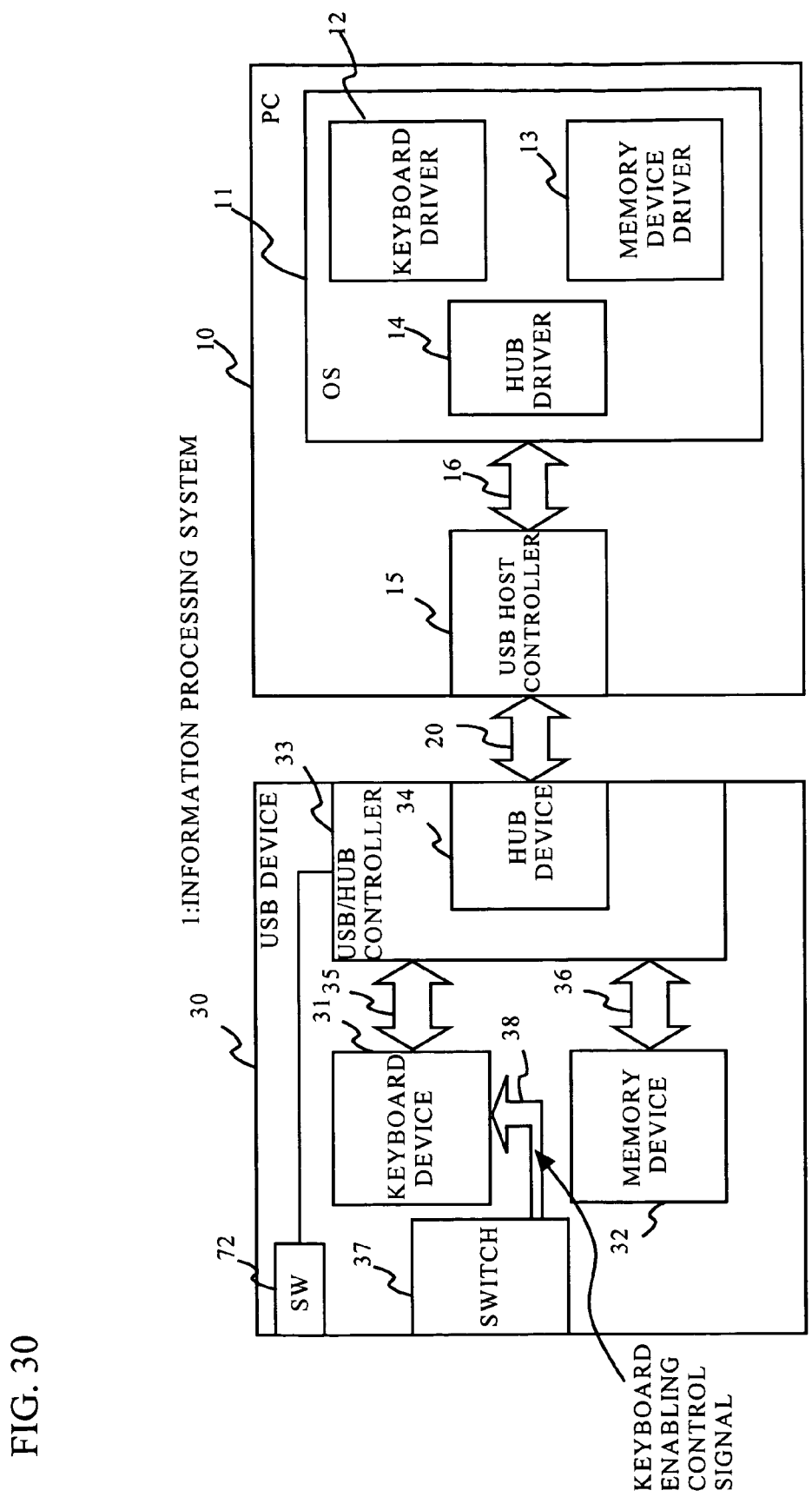
FIG. 30 shows an information processing system 1 in accordance with a fifth embodiment of the present invention.

If the USB device 30 is not correctly configured when the USB device 30 is connected to the PC 10 (for example, due to absence of the driver), the USB device 30 is recognized as an unknown device. In this state, the device that has been recognized cannot be determined whether the device is the keyboard device 31 or the memory device 32, in some cases. So, a switch 72 is provided in accordance with this embodiment, and the USB device 30 is put into the disabled state once by pushing the switch 72. The output of the switch 72 is connected to the USB/HUB controller 33 shown in FIG. 30, and the USB/HUB controller 33 sets the USB device 30 to the disabled state. The USB device 30 is thus reset to the initial configuration, and executes the general procedures to set the memory device 32 to the enabled state, and reads out the driver. After the drive installation, the keyboard device 31 is enabled, the keyboard device 31 is configured with the installed driver, and the operation starts.

Figure 31A:
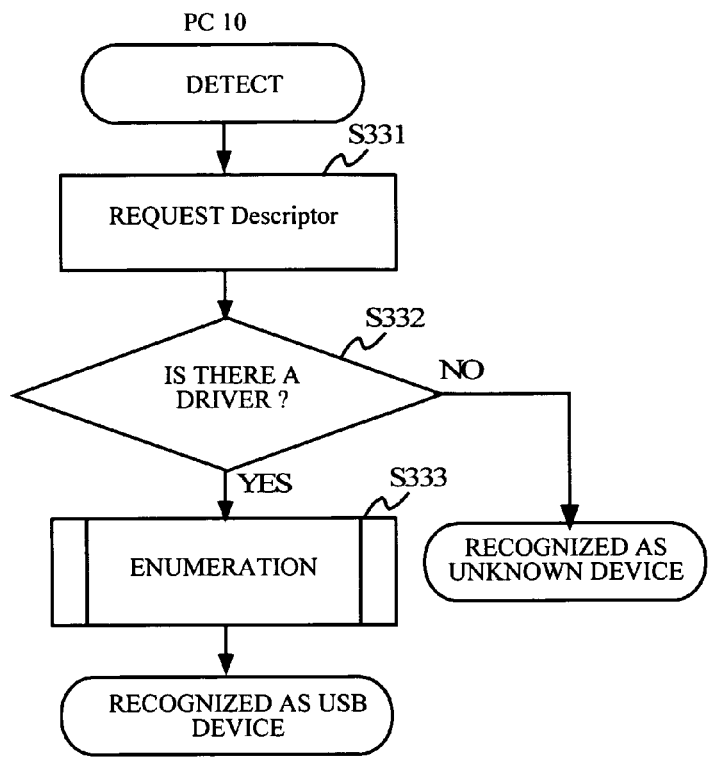
FIGS. 31A and 31B are flowcharts of operation procedures.
Figure 31B:
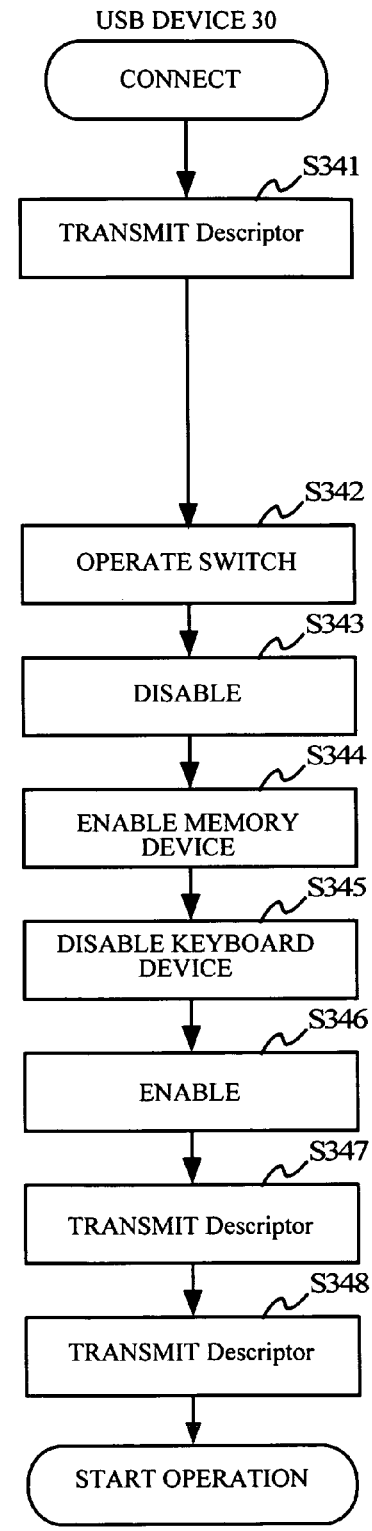

Referring now to the flowcharts of FIGS. 31A and 31B, the operation of this embodiment is described in detail. First, the procedures of the PC 10 is described with reference to FIG. 31A. Having detected the connection of the USB device 30, the PC 10 requests the USB device 30 for a "Descriptor" (step S331). If the PC 10 can acquire the driver from the USB device 30 ("Yes" in step S332), the enumeration is carried out as usual (step S333). If the PC 10 cannot acquire the driver from the USB device 30 ("No" in step S332), the USB device 30 is recognized as an unknown device (step S335).

Next, the procedures of the USB device 30 will be described with reference to FIG. 31B. Having been recognized as the unknown device by the PC 10, the USB device 30 is in the disabled state once by the operation of the switch 72 (step S343 and step S344). Then, the memory device 32 is enabled (step S344), the keyboard device 31 is disabled (step S345), and the memory device 32 is enabled and recognized by the PC 10 as the memory device 32 (step S346). In response to the "Descriptor" request from the PC 10, the memory device 32 transmits the "Descriptor" (step S347), and in response to the enumeration process from the PC 10, the memory device 32 transmits also transmits the "Descriptor" (step S348).

By the above described method, when a USB device that has been connected to a PC 10 is connected to another PC 10 to which the USB device has not been connected, the USB device is detected as an unknown keyboard. Since a driver does not exist in the memory device in the PC 10, a request for installation of a driver is issued. Thus, automatic installation can be performed. Also, the process of initializing the USB device prior to automatic installation can be eliminated. In this manner, a driver is always automatically installed in the case where the USB device is connected to the PC 10 in which the driver for the USB device has not been installed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic apparatus that includes a first device and a second device that stores a driver for the first device, the first device and the second device being capable of generating transactions on a common interface for external connections, the electronic apparatus comprising:
   a setting unit that puts the first device into an enabled state or a disabled state; and
   a control unit that activates the second device to operate when the first device is put into the disabled state by the setting unit, so that the driver can be read out from the second device via the interface.

2. The electronic apparatus as claimed in claim 1, wherein the second device allows the driver only to perform a reading operation.

3. The electronic apparatus as claimed in claim 1, wherein the second device includes a memory device that records the driver in a protected region.

4. The electronic apparatus as claimed in claim 1, wherein the setting unit puts the first device into the enabled state or the disabled state, in accordance with a control signal that is transmitted from an external device.

5. The electronic apparatus as claimed in claim 1, wherein the setting unit puts the first device into the enabled state or the disabled state, in accordance with a control signal that is transmitted from an information processing device via the common interface, the electronic apparatus being connected to the information processing device.

6. The electronic apparatus as claimed in claim 1, wherein the setting unit puts the first device into the enabled state or the disabled state, in accordance with setting information that is written by a RFID write device from the outside.

7. The electronic apparatus as claimed in claim 4, wherein the external device sets the first device into the enabled state or the disabled state through a vender request in accordance with the USB standard.

8. The electronic apparatus as claimed in claim 4, wherein the setting unit puts the first device into the enabled state or the disabled state through a predetermined signal that is transmitted from the external device.

9. The electronic apparatus as claimed in claim 4, wherein the setting unit receives the control signal from the external device that is connected via a special interface, and puts the first device into the enabled state or the disabled state in accordance with the control signal.

10. The electronic apparatus as claimed in claim 1, wherein the control unit has a HUB controller that controls transactions between the first and second devices and the interface.

11. The electronic apparatus as claimed in claim 1, wherein the control unit has a controller that controls the first device and the second device as one physical device.

12. The electronic apparatus as claimed in claim 1, wherein, when configured as an information processing device, the second device activates an installer for the driver, and copies the driver in the information processing device.

13. The electronic apparatus as claimed in claim 1, wherein the first device and the second device are selectively changed to the enabled state, according to a signal transmitted, in process of configuration, from an information processing device.

14. The electronic apparatus as claimed in claim 1, wherein, when configured by an information processing device, the second device counts a number of requests for a part of device information of thus configured device requested from an information processing device to determine configuration states of the first device and the second device.

15. The electronic apparatus as claimed in claim 13, wherein the signal is a vendor request signal transmitted in process of configuration.

16. The electronic apparatus as claimed in claim 1, wherein the second device is connected to the electronic apparatus as an external device or via a network.

17. The electronic apparatus as claimed in claim 1, further comprising an operation portion that puts the electronic device into the disabled state.

18. An information processing system, comprising:
an electronic apparatus that includes a first device and a second device that stores a driver for the first device, the first device and the second device being capable of generating transactions on a common interface for external connections; and
an information processing device that is connected to the electronic apparatus via the common interface,
the electronic apparatus comprising:
a setting unit that puts the first device into an enabled state or a disabled state; and
a control unit that activates the second device to operate when the first device is put into the disabled state by the setting unit, so that the driver can be read out from the second device via the interface.

19. The information processing system as claimed in claim 18, wherein the electronic apparatus inputs a control signal from the information processing device, so as to put the first device into the enabled state or the disabled state.

20. The information processing system as claimed in claim 18, wherein, when requesting the electronic apparatus to transmit device information of a device to be configured, the information processing device changes the number of requests for part of the device information between the first device and the second device.

21. The information processing system as claimed in claim 18, further comprising
a RFID write device that performs communications with the electronic apparatus through a RFID, and switches the state of the first device between the enabled state and the disabled state.

22. The information processing system as claimed in claim 18, further comprising
a setting device that is connected to the electronic apparatus, and switches the state of the first device between the enabled state and the disabled state.

23. The information processing system as claimed in claim 22, wherein the setting device puts the first device into the enabled state or the disabled state in accordance with a vender request in compliance with the USB standard.

24. The information processing system as claimed in claim 22, wherein the setting device puts the first device into the enabled state or the disabled state in accordance with a predetermined signal.

25. The information processing system as claimed in claim 22, wherein the setting device is connected to the electronic apparatus via a special interface, and puts the first device into the enabled state or the disabled state in accordance with a control signal that is transmitted via the special interface.

26. A method of controlling an electronic apparatus that includes a first device and a second device that stores a driver for the first device, the first device and the second device being capable of generating transactions on a common interface for external connections,
the method comprising the steps of:
putting the first device into an enabled state or a disabled state; and
activating the second device to operate when the first device is put into the disabled state, so that the driver can be read out from the second device via the interface.

27. A method of controlling an information processing system that includes an electronic apparatus containing a first device and a second device that stores a driver for the first device, and an information processing device that is connected to the electronic apparatus via a common interface for external connections,
the method comprising the steps of:
changing the number of requests for part of device information between the first device and the second device, when the information processing device requests the electronic apparatus to transmit the device information of a device to be configured; and
counting the number of requests for part of the device information of the device to be configured, the requests being transmitted from the information processing device, so that the electronic apparatus can determine whether the configuring is for the first device or the second device.

28. A method of controlling an information processing system that includes an electronic apparatus containing a first device and a second device that stores a driver for the first device, and an information processing device that is connected to the electronic apparatus via a common interface for external connections,
the method comprising the steps of:
detecting a signal transmitted from the information processing system in process of configuration;
enabling the second device when the signal cannot be detected; and
enabling the first device when the signal is detected.

* * * * *